US011582153B2

(12) United States Patent
Lewin et al.

(10) Patent No.: US 11,582,153 B2
(45) Date of Patent: Feb. 14, 2023

(54) LOAD-BALANCING ESTABLISHMENT OF CONNECTIONS AMONG GROUPS OF CONNECTOR SERVERS

(71) Applicant: Microsoft Technology Licensing, LLC, Redmond, WA (US)

(72) Inventors: Guy Lewin, New York City, NY (US); Daniel Senderovich, Netanya (IL); Vitaly Khait, Yavne (IL); Yossef Haber, Gannei Tikva (IL); Amir Geri, Modi'in (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/865,060

(22) Filed: May 1, 2020

(65) Prior Publication Data
US 2021/0344602 A1 Nov. 4, 2021

(51) Int. Cl.
*H04L 47/125* (2022.01)
*H04L 45/02* (2022.01)
*H04L 45/12* (2022.01)
*H04L 47/70* (2022.01)

(52) U.S. Cl.
CPC ............ *H04L 47/125* (2013.01); *H04L 45/10* (2013.01); *H04L 45/123* (2013.01); *H04L 47/828* (2013.01)

(58) Field of Classification Search
CPC ..... H04L 47/125; H04L 45/10; H04L 47/828; H04L 45/123
See application file for complete search history.

(56) References Cited

U.S. PATENT DOCUMENTS

| 2009/0070406 | A1 | 3/2009 | Terpstra et al. | |
| 2010/0027422 | A1 | 2/2010 | Fodil et al. | |
| 2010/0154047 | A1 | 6/2010 | Roach et al. | |
| 2015/0113154 | A1 | 4/2015 | Nguyen et al. | |
| 2016/0380789 | A1* | 12/2016 | Gunnalan | H04L 61/2589 709/228 |
| 2018/0309717 | A1* | 10/2018 | Moore | H04L 67/146 |

OTHER PUBLICATIONS

"International Search Report and Written Opinion Issued in PCT Application No. PCT/US21/022496", dated May 31, 2021, 12 Pages.
Takabatake, et al., "A Scheme of Relay Server Selection Methods for NAT Traversal through Home Gateways", In Proceedings of the IEEE Australasian Telecommunication Networks and Applications Conference, Dec. 7, 2008, pp. 116-121.

\* cited by examiner

*Primary Examiner* — Jackie Zuniga Abad
(74) *Attorney, Agent, or Firm* — Wade IP Law PLLC

(57) ABSTRACT

Techniques are described herein that are capable of load-balancing establishment of connections among groups of connector servers in a public computer network by performing operations that include receiving a connection request from a connector client in a private computer network, requesting establishment of a connection between the connector client and one of the connector servers in the public computer network. A number of connections between the private computer network and each group is determined. An identified group is selected from the groups based at least in part on a number of connections between the private computer network and the identified group being less than or equal to a number of connections between the private computer network and each other group. The connection request is provided toward the identified group, which enables establishment of the connection between the connector client and a connector server in the identified group.

20 Claims, 10 Drawing Sheets

LOAD-BALANCING ESTABLISHMENT OF CONNECTIONS AMONG GROUPS OF CONNECTOR SERVERS

BACKGROUND

A variety of services are available to enable access to private networks through the Internet. Each of the private networks may be an on-premises network or a private cloud. The services typically enable access to the private networks by installing "connector clients" within the private networks. Each connector client that is installed within a private network typically is configured to route traffic from the Internet into the private network. The connector clients traditionally operate generically, listening for incoming resource requests from the Internet.

For example, a connector client may expose a public Internet IP address to receive the resource requests from the Internet, which may require firewall exceptions and network address translation (NAT) rules for traffic to be routed into the connector client within the private network. In another example, the connector client may establish a site-to-site connection to a connector server that is able to access the connector client and the Internet. In this example, the connector server exposes a public internet IP address to receive the resource requests on behalf of the connector client. The site-to-site connection may connect local area networks (LANs) to a joint LAN, and it may not be possible to scale the solution to more than a few connector clients per connector server because the LANs may overlap.

Connector clients in both of the examples mentioned above expose the private networks within which the connector clients are installed to risks by enabling (either directly or via a connector server) creation of a connection from the Internet to a network that is intended to be private and typically behind NAT and a firewall. A connector client traditionally is capable of establishing a site-to-site connection to a single connector server, which may lead to a load of the connector server becoming too great for the connector server to adequately handle. For instance, the burden of the load may cause performance of the connector server to be degraded. Although multiple connector servers may be employed, the use of a load balancer with regard to the connector servers traditionally leads to traffic being routed through the same connector server.

SUMMARY

Various approaches are described herein for, among other things, load-balancing establishment of connections between a public computer network and a private computer network among multiple groups of connector servers. The public computer network is external to the private computer network. The public computer network includes multiple connector servers. The private computer network includes (e.g., hosts) multiple connector clients. The load-balancing may distribute the connections among the connector servers. The load-balancing may also distribute the connections among the connector clients. Load-balancing among connector servers (e.g., groups thereof) will be described herein as server-level load-balancing. Load-balancing among connector clients will be described herein as client-level load-balancing. Each connection between the private computer network and the public computer network exists between a single connector client in the private computer network and a single connector server in the public computer network. Each connector client may be connected to a single connector server. Each connector server may be connected to one or more connector clients, resulting in one or more respective connections. Each connection that is established between a connector client and a connector server enables the connector server to provide requests to access resources (a.k.a. resource requests) in the private computer network to the connector client.

In order for resources in the private computer network to be accessed by computing devices (e.g., user devices and/or a proxy server) in the public computer network, connections are established between connector clients in the private computer network and connector servers in the public computer network. Establishment of the connections is load-balanced among groups of connector servers.

In an example approach, connector servers that are included in a public computer network are assigned among groups. Each group including one or more of the connector servers. For instance, the connector server(s) in each group may not be included in any of the other groups. A connection request is received from a connector client that is included in a private computer network. The connection request requests establishment of a connection between the connector client and one of the connector servers in the public computer network. The public computer network is external to the private computer network. A number of connections between the private computer network and each group is determined. An identified group is selected from the groups to receive the connection request based at least in part on a number of connections between the private computer network and the identified group being less than or equal to a number of connections between the private computer network and each other group. The connection request is provided toward the identified group, which enables establishment of the connection between the connector client and a connector server in the identified group, based at least in part on the identified group being selected from the groups. For example, if the identified group includes a single connector server, the connection is established between the connector client and the sole connector server in the identified group. In another example, if the identified group includes multiple connector servers, the connection may be established between the connector client and any of the connector servers in the identified group based on any of a variety of factors to achieve load-balancing of connection establishment among the connector servers in the identified group.

Once a connection is established between a connector client and a connector server, a resource request that is received from a computing device (e.g., a user device or a proxy server) in the public computer network may be routed from the connector server to the connector client via the established connection. For instance, when a computing device provides a request to access a resource in the private computer network, the computing device may be notified of multiple connector servers that have connections with connector clients in the private computer network. The computing device may determine which connector server to use for obtaining access to the resource based on any of a variety of factors to achieve load-balancing of resource requests among the connector servers. If the connector server that is used by the computing device has connections with multiple connector clients in the private computer network, the connector server may determine which connector client to use for obtaining access to the resource based on any of a variety of factors to achieve load-balancing of resource requests among the connector clients. Otherwise, the connector server may use the only available connector client.

Information in the request that identifies the resource enables the connector client that is used by the connector server to provide access to the resource to the computing device.

For instance, a first request to access a resource that is included in a private computer network may be provided from a computing device that is included in a public computer network to a database that is included in the public computer network. The first request includes a network identifier that identifies the private computer network. A response to the first request may be received at the computing device from the database. The response includes internet protocol addresses that correspond to respective connector servers that are included in the public computer network based at least in part on the internet protocol addresses being cross-referenced with the network identifier in the database. A designated internet protocol address, which corresponds to a designated connector server, may be selected from the internet protocol addresses by the computing device based at least in part on a comparison of attributes of the respective connector servers. Access of the computing device to the resource may be triggered by providing a second request to access the resource from the computing device to the designated connector server using the designated internet protocol address. The second request includes the network identifier and a resource identifier that identifies the resource. Providing the second request may cause the designated connector server to provide the second request to access the resource to an identified connector client, which is hosted by the private computer network and which is configured to provide access to the resource using the resource identifier as a result of receiving the second request, via a connection between the identified connector client and the designated connector server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
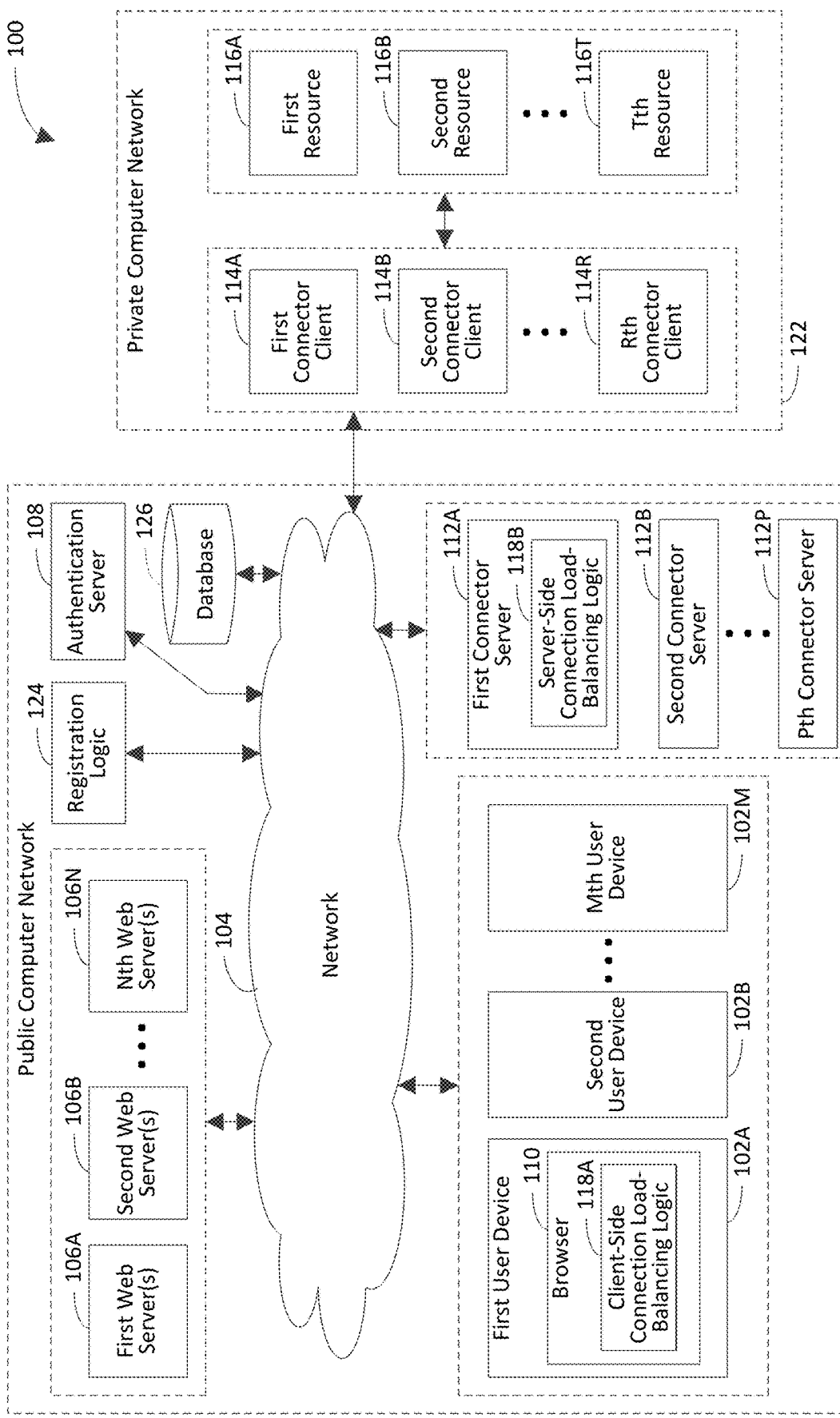
FIGS. 1-2 and 5-6 are block diagrams of example connection establishment load-balancing systems in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of load-balancing establishment of connections between a public computer network and a private computer network among multiple groups of connector servers. The public computer network is external to the private computer network. The public computer network includes multiple connector servers. The private computer network includes (e.g., hosts) multiple connector clients. The load-balancing may distribute the connections among the connector servers. The load-balancing may also distribute the connections among the connector clients. Load-balancing among connector servers (e.g., groups thereof) will be described herein as server-level load-balancing. Load-balancing among connector clients will be described herein as client-level load-balancing. Each connection between the private computer network and the public computer network exists between a single connector client in the private computer network and a single connector server in the public computer network. Each connector client may be connected to a single connector server. Each connector server may be connected to one or more connector clients, resulting in one or more respective connections. Each connection that is established between a connector client and a connector server enables the connector server to provide requests to access resources (a.k.a. resource requests) in the private computer network to the connector client.

In order for resources in the private computer network to be accessed by computing devices (e.g., user devices and/or a proxy server) in the public computer network, connections are established between connector clients in the private computer network and connector servers in the public computer network. Establishment of the connections is load-balanced among groups of connector servers in accordance with one or more of the techniques described herein.

Once a connection is established between a connector client and a connector server, a resource request that is received from a computing device (e.g., a user device or a proxy server) in the public computer network may be routed from the connector server to the connector client via the established connection. For instance, when a computing device provides a request to access a resource in the private computer network, the computing device may be notified of multiple connector servers that have connections with connector clients in the private computer network. The computing device may determine which connector server to use for obtaining access to the resource based on any of a variety of factors to achieve load-balancing of resource requests among the connector servers. If the connector server that is used by the computing device has connections with multiple connector clients in the private computer network, the connector server may determine which connector client to use for obtaining access to the resource based on any of a variety of factors to achieve load-balancing of resource requests among the connector clients. Otherwise, the connector server may use the only available connector client. Information in the request that identifies the resource enables the connector client that is used by the connector server to provide access to the resource to the computing device.

Example techniques described herein have a variety of benefits as compared to conventional techniques for establishing a connection between a private computer network and a public computer network. For instance, the example techniques may be capable of load-balancing establishing of connections between the private computer network and the public computer network across multiple connector servers and/or multiple connector clients. Load-balancing the establishment of the connections may enable the connector clients and the connector servers to handle connection requests and subsequent resource requests more efficiently. For example, an average efficiency of the connector clients and/or the connector servers may be increased by causing a connection to be established between a connector client and a first group of connector servers, rather than a second group of connector servers, based on a comparison of attributes of the first and second groups (e.g., a number of connections associated with each of the first and second groups). The example techniques may be capable of guaranteeing that two consecutive connection requests from respective connector clients in the same private computer network (e.g., and sharing the same tenant identifier) are provided to different groups of connection servers.

Load-balancing the establishment of the connections may enable the connector clients and the connector servers to handle connection requests and subsequent resource requests more reliably. For instance, the load-balancing may provide redundancy of established connections between the private and public computer networks. For example, when connections are established between the private computer network and respective groups of connector servers in the public network and a group of the connector servers goes offline (e.g., for a restart, updates, upgrades, or performance issues), resources in the private computer network remain accessible through the groups of connector servers that remain online (e.g., via the connections between the private computer network and those groups).

The example techniques may increase security of the private computer network. For instance, when a connector client in the private computer network establishes a connection with a connector server, only the connector server is allowed to communicate with the connector client via the connection. No other entities are able to communicate with the connector client via the connection.

The example techniques may reduce an amount of time and/or assets (e.g., processor, memory, network bandwidth) that are consumed to establish connections between a private computer network and a public computer network. For example, by load-balancing establishment of the connections among groups of connector servers, an amount of time and/or assets consumed to establish the connections using a relatively overloaded connector server or group of connector servers may be reduced (e.g., avoided). Moreover, performance of remedial measures to reduce an excessive load on such a connector server or group of connector servers while performance of the connector server or group is compromised (e.g., degraded) due to the excessive load may be avoided.

The example techniques may be capable of increasing speed of access to resources in the private computer network; increasing availability, speed, and stability of connector clients in the private computer network and/or connector servers to which the connector clients are connected; reducing CPU usage of the connector clients and/or the connector servers, etc.

The example techniques may increase user efficiency, for example, by reducing a number of steps and/or an amount of time that a user takes in an attempt to access a resource. For instance, load-balancing establishment of the connections to the private computer network may reduce a likelihood that the user will be unable to access a resource in the private computer network due to no connections between the public computer network and the private computer network being available. Load-balancing the establishment of the connections may reduce a likelihood that the user will restart an attempt to access the resource due to a delay that results from a connector server and/or a connector client associated with a connection being overloaded (e.g., by other requests for resources).

FIG. 1 is a block diagram of an example connection establishment load-balancing system 100 in accordance with an embodiment. Generally speaking, the connection establishment load-balancing system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the connection establishment load-balancing system 100 load-balances connections to a private computer network 122.

As shown in FIG. 1, the connection establishment load-balancing system 100 includes a public computer network 120 and the private computer network 122. The private computer network 122 includes (e.g., hosts) a plurality of connector clients 114A-114R and a plurality of resources 116A-116T. The connector clients 114A-114R are deployed in the private computer network 122, for example, by a tenant (e.g., owner) who owns the private computer network 122. Each of the connector clients 114A-114R may be a respective process running on one or more processors in the private computer network 122. Each of the connector clients 114A-114R is capable of establishing one or more connections with any one or more respective connector servers 112A-112P that are included in the public computer network 120 to facilitate providing access to the resources 116A-116T. Each of the resources 116A-116T may be a document (e.g., web page, image, audio file, video file, etc.), output of an executable, or any other suitable type of resource.

The public computer network 120 is external to the private computer network 122. The public computer network 120 includes a plurality of user devices 102A-102M, a network 104, a plurality of web servers 106A-106N, an authentication server 108, a database 126, a plurality of connector servers 112A-112P, and registration logic 124. Communication among the user devices 102A-102M, the web servers 106A-106N, the authentication server 108, the database 126, the connector servers 112A-112P, and the registration logic 124 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the web servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the web servers 106A-106N for requesting information stored on (or otherwise accessible via) the web servers 106A-106N. The user devices 102A-102M are further configured to provide requests to the connector servers 112A-112P for requesting access to the private network 122 (e.g., one or more of the resources 116A-116T therein). For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., websites) hosted by the web servers 106A-106N or included among the resources 116A-116T in the private computer network 122, so that the user devices 102A-102M may access information that is available via the domains. Such domains may include web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more web servers 106A-106N and/or any one or more connector servers 112A-112P.

The first user device 102A includes a browser 110. The browser 110 is a software application that is configured to enable a user of user device 102A to access resources on the World Wide Web (WWW). For example, when the user provides a request for a resource that is stored among the web servers 106A-106N, the browser retrieves the resource from one or more of the web servers 106A-106N and provides the resource for display to the user on the user device 102A. In another example, when the user provides a request for a resource (e.g., any of resources 116A-116T) that is stored in the private computer network 122, the browser (e.g., client-side connection load-balancing logic 118A therein) retrieves the resource from the private computer network 122 in accordance with one or more of the example techniques described herein and provides the resource for display to the user on the user device 102A. For each of these examples, the request for the resource may include a uniform resource identifier (URI) that corresponds to a location (e.g., memory location on a web server or in the private computer network 122) at which the resource is hosted. The URI may be a uniform resource locator (URL) or a uniform resource name (URN). Upon receiving the request, the browser 110 may retrieve the resource from a web server or the private computer network 122 that hosts the resource based on the URI. It will be recognized that the resource may be a webpage (e.g., hypertext markup language (HTML) document).

The browser 110 includes client-side connection load-balancing logic 118A. The client-side connection load-balancing logic 118A is configured to provide requests for resources (e.g., any of the resources 116A-116T) stored in the private computer network 122. For example, the client-side connection load-balancing logic 118A may generate such a request based on (e.g., based at least in part on) instructions that are received from a user of a user device (e.g., any of user devices 102A-102B). For instance, the instructions may be received via a user interface of the user device. The instructions may instruct the client-side connection load-balancing logic 118A to request the resource. In another example, the client-side connection load-balancing logic 118A may generate such a request not based on instructions that are received from a user of a user device (e.g., independently from such instructions).

In an example implementation, the client-side connection load-balancing logic 118A provides a request for a resource to the database 126. The request includes a network identifier that identifies the private computer network 122. In accordance with this implementation, the client-side connection load-balancing logic 118A receives a response to the request from the database 126. The response includes multiple internet protocol addresses that correspond to respective connector servers (e.g., any of connector servers 112A-112P) based at least in part on the internet protocol addresses being cross-referenced with the network identifier in the database 126. In further accordance with this implementation, the client-side connection load-balancing logic 118A selects a designated internet protocol address, which corresponds to a designated connector server, from the internet protocol addresses that are received from the database 126 based at least in part on a comparison of attributes of the connector servers to which the received internet protocol addresses correspond. Examples of an attribute of a connector server include but are not limited to a geographic location of the connector server, a proportion of time for which the connector server is available, an extent to which a processor and/or memory of the connector server is utilized, and a number of requests for resource(s) that are handled (e.g., processed) by the connector server. In further accordance with this implementation, the client-side connection load-balancing logic 118A triggers access of the first user device 102A to the resource by providing a second request to access the resource to the designated connector server using the designated internet protocol address. The second request includes the network identifier and a resource identifier that identifies the resource. By providing the second request, the client-side connection load-balancing logic 118A causes the designated connector server to provide the second request to access the resource to an identified connector client (e.g., any of connector clients 114A-114R) via the connection between the identified connector client and the designated connector server, which causes the identified connector client to provide access to the resource using the resource identifier.

The browser 110 is shown to be incorporated in the first user device 102A for illustrative purposes and is not intended to be limiting. It will be recognized that the browser 110 may be incorporated in any of the user devices 102A-102M. For instance, each of the user devices 102A-102M may include a respective browser.

The web servers 106A-106N are processing systems that are capable of communicating with the user systems 102A-102M. The web servers 106A-106N are configured to execute computer programs that provide resources to users in response to receiving requests from the users. For example, the resources may include documents (e.g., web pages, images, audio files, video files, etc.), output of executables, or any other suitable type of resources. In accordance with some example embodiments, the web servers 106A-106N are configured to host respective web sites, so that the web sites are accessible to users of the connection establishment load-balancing system 100.

The connector servers 112A-112P are processing systems that are capable of communicating with the user systems 102A-102M. The connector servers 112A-112P are configured to serve as intermediaries between the user devices 102A-102M and the connector clients 114A-114R in response to the connector clients 114A-114R establishing connections with the connector servers 112A-112P.

The first connector server 112A includes server-side connection load-balancing logic 118B. The server-side connection load-balancing logic 118B is configured to facilitate providing access to the resources 116A-116T in the private computer network 122 in response to receipt of requests for those resources 116A-116T from a user device (e.g., any of user devices 102A-102M). For instance, when the server-side connection load-balancing logic 118B receives a request for a resource from the client device (e.g., client-side connection load-balancing logic 118A therein), the server-side connection load-balancing logic 118B provides (e.g., forwards) a resource identifier that identifies the resource to an identified connector client to enable the identified connector client to provide access to the resource to the user device. The server-side connection load-balancing logic 118B may select the identified connector client from any of the connector clients 114A-114R with which the connector server has a connection based at least in part on a comparison of attributes of those connector clients 114A-114R. Examples of an attribute of a connector client include but are not limited to an amount of processing and/or memory assets that are consumed by the connector client and a number of requests for resource(s) that are handled by the connector client.

The server-side connection load-balancing logic 118B is shown to be incorporated in the first connector server 112A for illustrative purposes and is not intended to be limiting. It will be recognized that the server-side connection load-balancing logic 118B may be incorporated in any of the connector servers 112A-112P. For instance, each of the connector servers 112A-112P may include respective server-side connection load-balancing logic.

The registration logic 124 is configured to load-balance establishment of connections among groups of the connection servers 112A-112P. For instance, the registration logic 124 assigns the connector servers 112A-112P among the groups such that each group includes at least one of the connector servers 112A-112P. The connector servers 112A-112P may be distributed among the groups such that none of the connector servers 112A-112P is included in more than one group. The registration logic 124 is configured to process connection requests from the connector clients 114A-114R. Each connection request that is received from a connector client requests establishment of a connection between the connector client and one of the connector servers 112A-112P. Upon receipt of each connection request, the registration logic 124 determines a number of connections between the private computer network 122 (e.g., any of the connector clients 114A-114R therein) and each group. Upon receipt of each connection request, the registration logic 124 also selects one of the groups to receive the connection request based at least in part on a number of connections between the private computer network 122 and the selected group being less than or equal to a number of connections between the private computer network 122 and each other group. Upon receipt of each connection request, the registration logic 124 also provides the connection request toward the selected group corresponding to that connection request, which enables establishment of the respective connection between the connector client from which the connection request was received and a connector server in the selected group.

In an example implementation, the registration logic 124 includes a registration server, which performs the operations described above with respect to the registration logic 124. In another example, the registration logic 124 includes multiple registration servers, a registration server load balancer to load-balance the registration servers, and a database to store a shared state, which is shared by the registration servers. Further detail regarding some example implementations of the registration logic 124 is provided below in the discussion of FIGS. 5-8.

The authentication server 108 is configured to issue tokens in response to requests that are received from the connector clients 114A-114R. The authentication server 108 is further configured to validate tokens that are received from the connector servers 112A-112P. In a connection establishing example, when a connector client attempts to establish a connection with a connector server, the connector server may request a token from the connector client, which prompts the connector client to request the token from the authentication server 108. After the authentication server 108 issues the token to the connector client, the connector client may provide the token to the connector server, and the connector server may forward the token that was received from the connector client to the authentication server 108 for validation.

In accordance with the connection establishing example, the authentication server 108 may compare the token that was issued by the authentication server 108 and the token that was received from the connector server to determine whether to validate the token that was received from the connector server. If the token that was issued by the authentication server 108 and the token that was received from the connector server match (e.g., are the same or semantically the same), the authentication server 108 validates the token that was received from the connector server. If the token that was issued by the authentication server 108 and the token that was received from the connector server do not match, the authentication server 108 does not validate the token that was received from the connector server. The authentication server 108 validating the token that was received from the connector server enables the connector client to register a new connection between the connector client and the connector server with the database 126, thereby establishing the connection. The authentication server 108 not validating (e.g., invalidating) the token that was received from the connector server does not enable the connector client to register the new connection, and the connection is therefore not established.

The database 126 stores network identifiers and IP addresses that are received from the connector servers 112A-112P when connections are registered with the database 126 (e.g., when the connections are established). Each IP address identifies (e.g., uniquely identifies) a connector server. Each network identifier identifies a private computer network (e.g., private computer network 122). For example, when a connection is to be established between a connector client and a connector server, the database 126 receives the following from the connector server: (A) a network identifier that identifies the private computer network that hosts the connector client and (B) an IP address that identifies the connector server. In accordance with this example, the database 126 cross-references the network identifier and the IP address to describe the connection. In an aspect, the database 126 may cross-reference the network identifier and the IP address by storing the network identifier and the IP address in a common (i.e., same) row of the database 126. In another aspect, the database 126 may cross-reference the network identifier and the IP address by generating cross-reference information that indicates (e.g., describes) a relationship between the network identifier and the IP address. The database 126 may cross-reference the network identifier and the IP address for each connection that is to be established.

In accordance with the aforementioned example, when the database 126 subsequently receives a request for an IP address of a connector server that has a connection with a connector client hosted by the private computer network from the client-side connection load-balancing logic 118A, the database 126 may provide all IP addresses of respective connector servers that have a connection with a connector client hosted by the private computer network, enabling the client-side connection load-balancing logic 118A to perform server-level load-balancing with regard to those connector servers. For instance, the database 126 may determine all IP addresses of respective connector servers that have a connection with a connector client hosted by the private computer network based at least in part on those internet protocol addresses being cross-referenced with the network identifier that identifies the private computer network. In an aspect, the database 126 may traverse the rows of the database 126 to identify those rows in which the network identifier is cross-referenced with an IP address and then forward the cross-referenced IP addresses to the client-side connection load-balancing logic 118A. In another aspect, the database 126 may review generated cross-reference information to identify which IP addresses are indicated by the cross-reference information to have a relationship with the network identifier and then forward those IP address to the client-side connection load-balancing logic 118A.

The client-side connection load-balancing logic 118A and/or the server-side connection load-balancing logic 118B may be implemented in various ways to load-balance connections to the private computer network 122, including being implemented in hardware, software, firmware, or any combination thereof. The registration logic 124 may be implemented in various ways to load-balance establishment of the connections among groups of the connector servers 112A-112P, including being implemented in hardware, software, firmware, or any combination thereof. For example, the client-side connection load-balancing logic 118A, the server-side connection load-balancing logic 118B, and/or the registration logic 124 may be implemented as computer program code configured to be executed in one or more processors. In another example, the client-side connection load-balancing logic 118A, the server-side connection load-balancing logic 118B, and/or the registration logic 124 may be at least partially implemented as hardware logic/electrical circuitry. For instance, the client-side connection load-balancing logic 118A, the server-side connection load-balancing logic 118B, and/or the registration logic 124 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
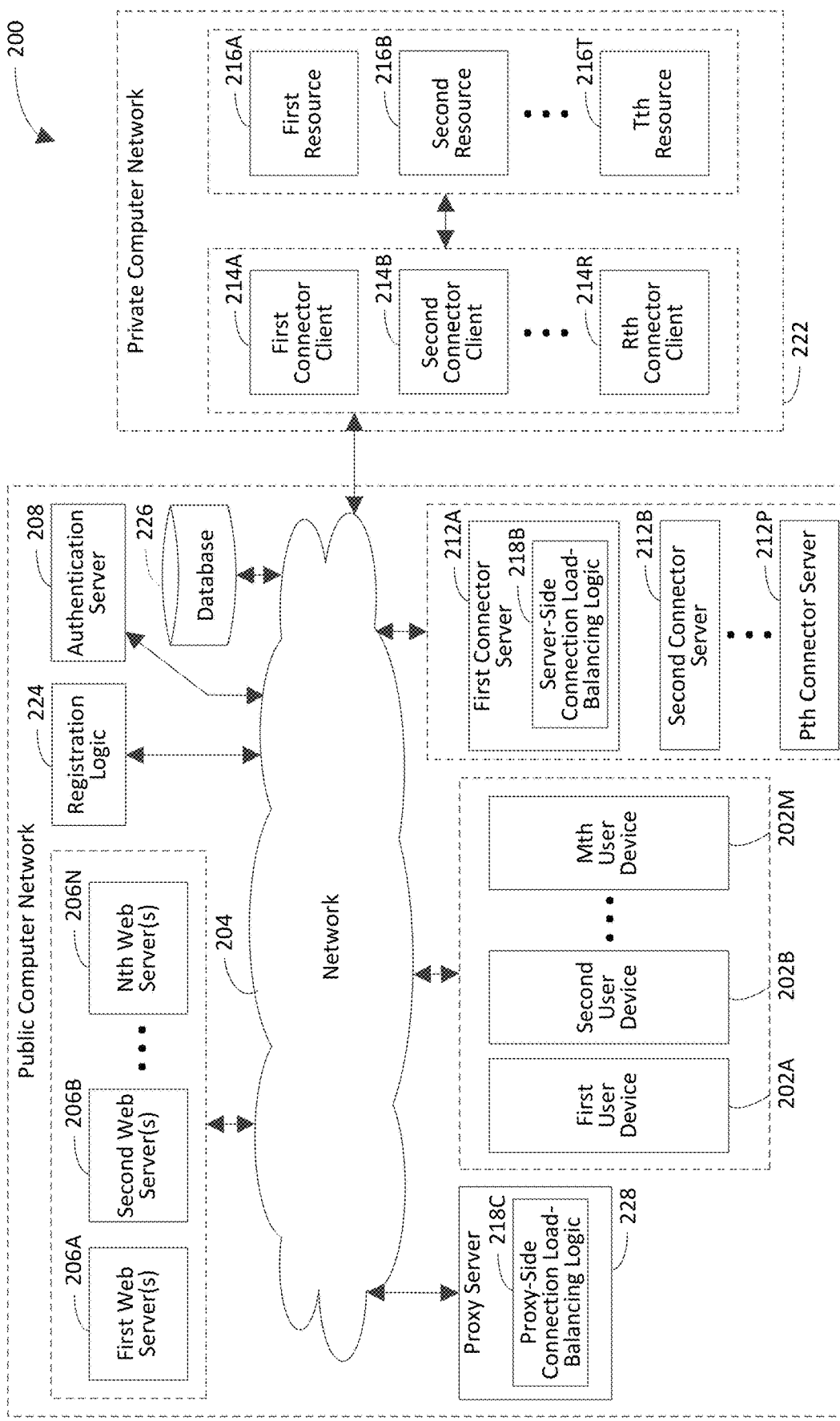

FIG. 2 is a block diagram of another example connection establishment load-balancing system 200 in accordance with an embodiment. The connection establishment load-balancing system 200 in FIG. 2 is substantially the same as the connection establishment load-balancing system 100 shown in FIG. 1, except that the connection establishment load-balancing system 200 includes a proxy server 228. Moreover, a first user device 202A in FIG. 2 does not include the client-side connection load-balancing logic 118A shown in FIG. 1. Instead, the proxy server 200 includes proxy-side connection load-balancing logic 218C, which includes functionality similar to the functionality of the client-side connection load-balancing logic 118A shown in FIG. 1.

As shown in FIG. 2, the connection establishment load-balancing system 200 includes a public computer network 220 and a private computer network 222. The private computer network 222 includes a plurality of connector clients 214A-214R and a plurality of resources 216A-216T, which are operable in a manner similar to the connector clients 114A-114R and the resources 116A-116T shown in FIG. 1.

The public computer network 220 includes a plurality of user devices 202A-202M, a network 204, a plurality of web servers 206A-206N, an authentication server 208, a database 226, a plurality of connector servers 212A-212P, and registration logic 224, which are operable in a manner similar to the plurality of user devices 102A-102M, the network 104, the plurality of web servers 106A-106N, the authentication server 108, the database 126, the plurality of connector servers 112A-112P, and the registration logic 124, respectively, shown in FIG. 1, except that the first user device 202A does not include the client-side connection load-balancing logic 118A shown in FIG. 1. Although the first user device 202A is not shown to include a browser, it will be recognized that any of the user devices 202A-202M may include a browser. The public computer network 220 further includes the proxy server 228. Communication among the user devices 202A-202M, the web servers 206A-206N, the authentication server 208, the database 226, the connector servers 212A-212P, the registration logic 224, and the proxy server 228 is carried out over the network 204 using well-known network communication protocols.

The proxy server 228 is a processing system that serves as an intermediary between the user devices 202A-202M and the web servers 206A-206N to intercept requests initiated by the user devices 202A-202M that request resources from the web servers 206A-206N. The proxy server also serves as an intermediary between the user devices 202A-202M and the connector servers 212A-212P to intercept requests initiated by the user devices 202A-202M to access the private network 222 (e.g., any of the resources 216A-216T therein). The proxy server 228 is configured to analyze and/or modify a resource that is requested by a client device before passing on the requested or modified resource to the client device. For example, the proxy server 228 may define and enforce policies to control users' behavior with regard to the resources; detect risky behavior, violations, and suspicious data points and activities regarding the resources; and integrate remediation workflows to mitigate risks. In accordance with this example, the proxy server 228 may modify the resources that are processed at a web server and/or the resources 216A-216T in the private computer network 222 based on the policies. It will be recognized that requests to access resources may be initiated by the proxy server 228. For instance, the requests need not necessarily be intercepted by the proxy server 228 from the user devices 202A-202M.

The proxy server 228 includes proxy-side connection load-balancing logic 218C. The proxy-side connection load-balancing logic 218C is configured to provide requests for resources (e.g., any of the resources 116A-116T) stored in the private computer network 122 in response to receipt of the requests from any of the user devices 102A-102M. For instance, the proxy-side connection load-balancing logic 218C may analyze the requests to identify the resources indicated therein, analyze and/or modify those resources, and then forward the requested or modified resources to the client device(s) from which the requests are received.

In an example implementation, the proxy-side connection load-balancing logic 218C provides a request for a resource to the database 126. The request includes a network identifier that identifies the private computer network 122. In accordance with this implementation, the proxy-side connection load-balancing logic 218C receives a response to the request from the database 126. The response includes multiple internet protocol addresses that correspond to respective connector servers (e.g., any of connector servers 112A-112P) based at least in part on the internet protocol addresses being cross-referenced with the network identifier in the database 226. In further accordance with this implementation, the proxy-side connection load-balancing logic 218C selects a designated internet protocol address, which corresponds to a designated connector server, from the internet protocol addresses that are received from the database 126 based at least in part on a comparison of attributes of the connector servers to which the received internet protocol addresses correspond. In further accordance with this implementation, the proxy-side connection load-balancing logic 218C triggers access of the proxy server 202 to the resource by providing a second request to access the resource to the designated connector server using the designated internet protocol address. The second request includes the network identifier and a resource identifier that identifies the resource. By providing the second request, the proxy-side connection load-balancing logic 218C causes the designated connector server to provide the second request to access the resource to an identified connector client (e.g., any of connector clients 114A-114R) via the connection between the identified connector client and the designated connector server, which causes the identified connector client to provide access to the resource using the resource identifier.

The proxy server 228 may be coupled to the user devices 202A-202M, the network 204, and/or the web servers 206A-206N in any suitable arrangement. For instance, the proxy server 228 may be configured as a forward proxy server or a reverse proxy server.

The proxy-side connection load-balancing logic 218C may be implemented in various ways to load-balance connections to the private computer network 122, including being implemented in hardware, software, firmware, or any combination thereof. For example, the proxy-side connection load-balancing logic 218C may be implemented as computer program code configured to be executed in one or more processors. In another example, the proxy-side connection load-balancing logic 218C may be at least partially implemented as hardware logic/electrical circuitry. For instance, the proxy-side connection load-balancing logic 218C may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 3A:
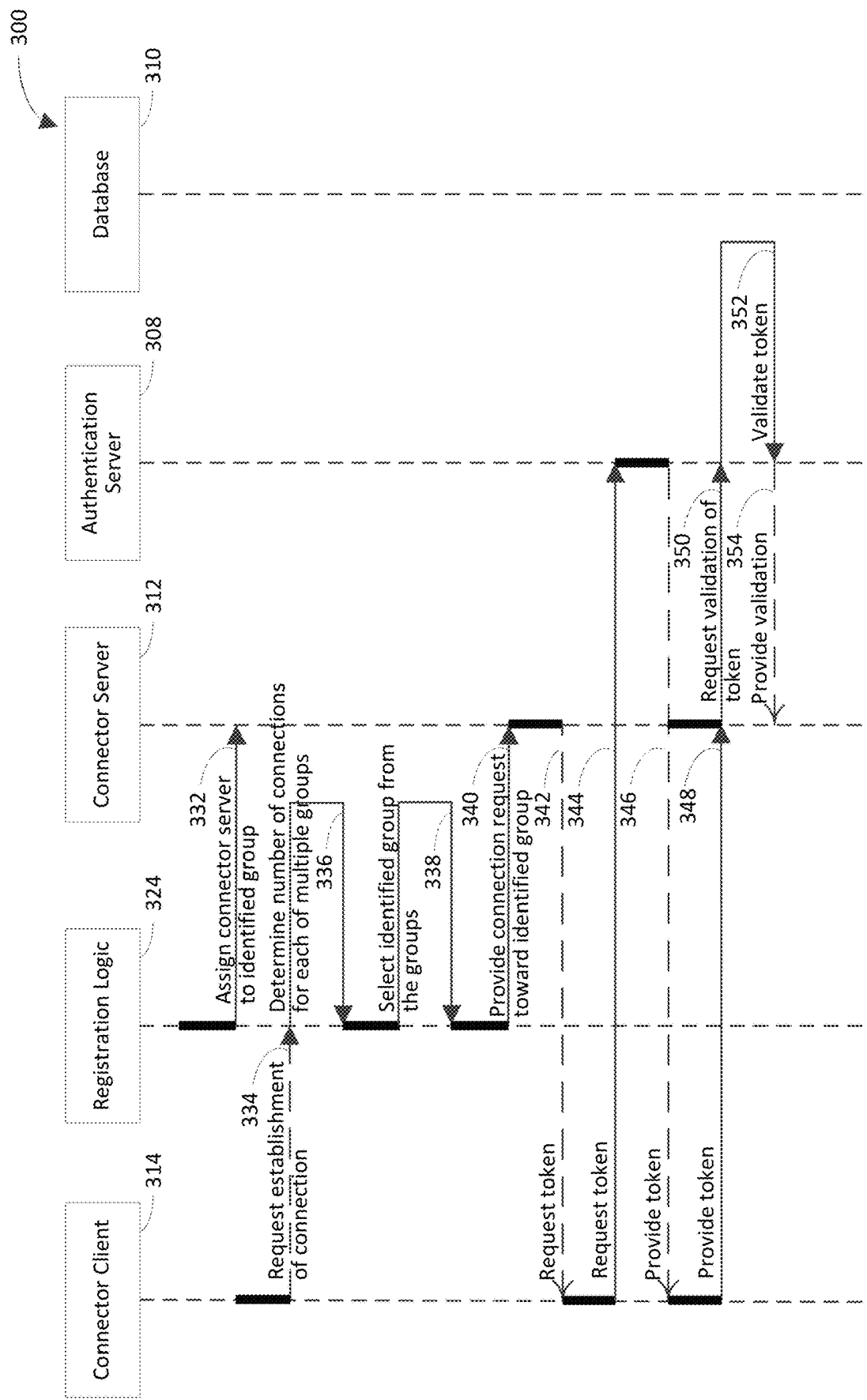
FIGS. 3A and 3B are respective portions of an example activity diagram for load-balancing establishment of connections among groups of connector servers in accordance with an embodiment.
Figure 3B:
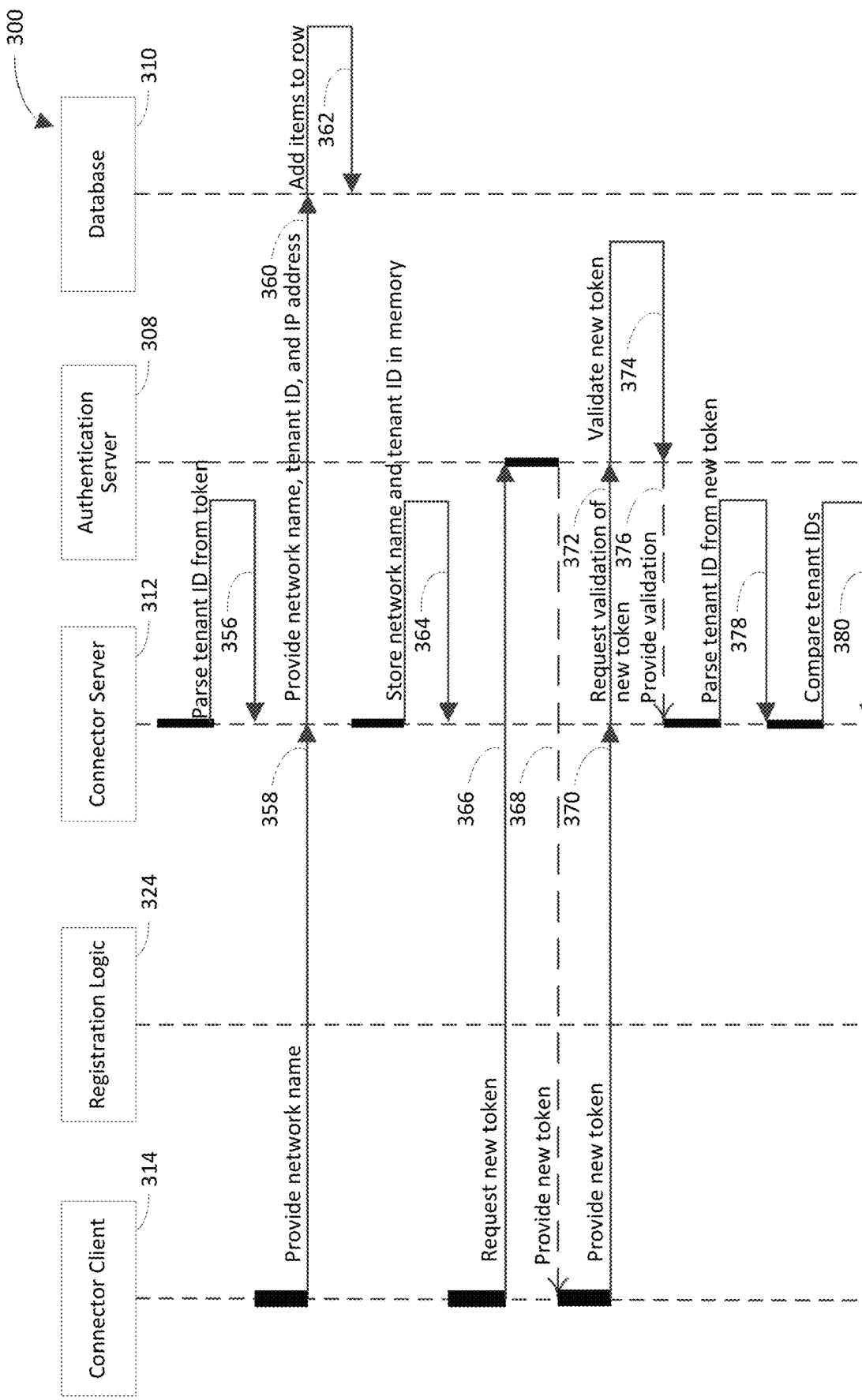

FIGS. 3A and 3B are respective portions of an example activity diagram 300 for load-balancing establishment of connections among groups of connector servers in accordance with an embodiment. Each of FIGS. 3A and 3B depicts a connector client 314, registration logic 324, a connector server 312, an authentication server 308, and a database 310, which are example implementations of a connector client 114 or 214, registration logic 124 or 224, a connector server 112 or 212, an authentication server 108 or 208, and a database 126 or 210 shown in FIGS. 1 and 2. Activities 332, 334, 336, 338, 340, 342, 344, 346, 348, 350, 352, 354, 356, 358, 360, 362, 364, 366, 368, 370, 372, 374, 376, 378, and 380 will now be described with reference to the connector client 314, the registration logic 324, the connector server 312, the authentication server 308, and the database 310.

In activity 332, the registration logic 324 assigns a connector server 312 to an identified group. For instance, the registration logic 324 may assign multiple connector servers among multiple groups such that each group includes at least one of the connector servers. However, assignment of a single connector server 312 is described herein for ease of discussion.

In activity 334, the connector client 314 provides a connection request, which requests establishment of a connection with a public computer network (e.g., public computer network 120 or 220). For instance, multiple connector clients in a private computer network (e.g., private computer network 122 or 222) may request respective connections with one or more public networks. However, a single connector client 314 is described herein for each of discussion.

In activity 336, the registration logic 324 determines a number of connections for each of multiple groups of connection servers. The number of connections for a group is the cumulative number of connections between the private computer network that includes the connector client 314 and the connector server(s) in the group.

In activity 338, the registration logic 324 selects the identified group from the groups based on (e.g., based at least in part on) the number of connections between the private computer network and the identified group being less than or equal to the number of connections between the private computer network and each other group.

In activity 340, the registration logic 324 provides the connection request toward the identified group. It will be recognized that the connection request that is provided by the registration logic 324 need not necessarily be same as the connection request provided by the connector client 314. It will be further recognized that any connector server in the identified group may be capable of servicing the connection request, subject to any criteria that may be established for determining which connector server in the identified group is to service the connection request. In the embodiment of FIG. 3A, the connector server 312 is shown to have been selected to service the connection request. It may be presumed that the connection server 312 satisfied any criteria that were established for servicing the connection request. For instance, the connection server 312 may have been selected to service the request based on the connection server 312 having no more connections with the private computer network than each other connection server in the identified group.

In activity 342, the connector server 312 requests a token from the connector client 314.

In activity 344, the connector client 314 requests the token from the authentication server 308.

In activity 346, the authentication server 308 provides the token to the connector client 314. For instance, the authentication server 308 may generate the token to include a secret associated with the connector client 314. In the embodiment of FIGS. 3A-3B, the secret includes a tenant identifier that identifies (e.g., uniquely identifies) an owner of the private computer network for non-limiting, illustrative purposes. It will be recognized that the secret need not necessarily include the tenant identifier.

In activity 348, the connector client 314 provides the token that was received from the authentication server 308 to the connector server 312.

In activity 350, the connector server 312 provides a validation request to the authentication server 308, requesting validation of the token that the connector client 314 provided to the connector server 312. For instance, the validation request may include the token that the connector client 314 provided to the connector server 312.

In activity 352, the authentication server 308 validates the token that the connector client 314 provided to the connector server 312. For instance, the authentication server 308 may compare the token that the connector client 314 provided to the connector server 312 and the token that the authentication server 308 provided to the connector client 314 to determine whether the tokens are same. If the tokens are the same, the authentication server 308 validates the token that the connector client 314 provided to the connector server 312. If the tokens are not the same, the authentication server 308 does not validate (e.g., invalidates) the token that the connector client 314 provided to the connector server 312. It will be presumed that the authentication server 308 validates the token that the connector client 314 provided to the connector server 312. Otherwise, the authentication server would not continue with performance of activity 354.

In activity 354, the authentication server 308 provides validation of the token that the connector client 314 provided to the connector server 312 to the connector server 312. Receipt of the validation by the connector server 312 indicates to the connector server 312 that the connector client 314 is, in fact, the connector client 314.

The flow of the activity diagram 300 continues at activity 356 in FIG. 3B. In activity 356, the connector server 312 parses the tenant identifier from the token that the connector client 314 provided to the connector server 312 or the token that the authentication server 308 provided to the connector client 314 (recall that the tokens are the same). It will be recognized that the connector server 312 may parse any suitable secret from the token. The secret need not necessarily be the tenant identifier. Activities are described below with reference to the tenant identifier. It will be recognized that those activities may be performed with regard to any suitable secret that need not necessarily include the tenant identifier.

In activity 358, the connector client 314 provides a network name, which is a name of the private computer network, to the connector server 312.

In activity 360, the connector server 312 provides the network name, the tenant identifier, and an Internet Protocol (IP) address of the connector server 312 to the database 310.

In activity 362, the database 310 adds the network name, the tenant identifier, and the IP address of the connector server 312 to a common (i.e., same) row of the database 310. By adding the network name, the tenant identifier, and the IP address of the connector server 312 to the common row of the database 310, the database 310 cross-references the network name and the tenant identifier with the IP address. It will be recognized that the database 310 need not necessarily add the network name, the tenant identifier, and the IP address of the connector server 312 to the common row. For instance, the database 310 may cross-reference the network name and the tenant identifier with the IP address in any suitable way. For instance, the database 310 may generate cross-reference information to indicate a relationship between the network name, the tenant identifier, and the IP address. By indicating the relationship, the cross-reference information may cross-reference the network name and the tenant identifier with the IP address.

In activity 364, the connector server 312 stores the network name and the tenant identifier in memory (e.g., memory of the connector server 312).

In activity 366, the connector client 314 requests a new token from the authentication server 308.

In activity 368, the authentication server 308 provides the new token to the connector client 314. For instance, the authentication server 308 may generate the new token to include a secret (e.g., tenant identifier) associated with the connector client 314.

In activity 370, the connector client 314 provides the new token that was received from the authentication server 308 to the connector server 312.

In activity 372, the connector server 312 provides a validation request to the authentication server 308, requesting validation of the new token that the connector client 314 provided to the connector server 312. For instance, the validation request may include the new token that the connector client 314 provided to the connector server 312.

In activity 374, the authentication server 308 validates the new token that the connector client 314 provided to the connector server 312. For instance, the authentication server 308 may compare the new token that the connector client 314 provided to the connector server 312 and the new token that the authentication server 308 provided to the connector client 314 to determine that the tokens are same.

In activity 376, the authentication server 308 provides validation of the new token that the connector client 314 provided to the connector server 312 to the connector server 312. Receipt of the validation by the connector server 312 indicates to the connector server 312 that the connector client 314 is, in fact, the connector client 314.

In activity 378, the connector server 312 parses the tenant identifier from the new token that the connector client 314 provided to the connector server 312 or the new token that the authentication server 308 provided to the connector client 314 (recall that the tokens are the same).

In activity 380, the connector server 312 compares the tenant identifier that was parsed from the new token at activity 378 and the tenant identifier that was parsed from the token at activity 356 to determine whether the tenant identifiers are same. The tenant identifiers being the same indicates that the connection between the connector client 314 and the connection server 312 continues to exist (e.g., neither the connector client 314 nor the connector server 312 has dropped the connection).

Activities 366, 368, 370, 372, 374, 376, 378, and 380 represent a re-registering process (a.k.a. refreshing process) that may be performed iteratively on a periodic schedule. For instance, the connector client 314 may be required to refresh each of its connections (e.g., each connection between the connector client 314 and the connector server 312) periodically in accordance with the periodic schedule to prevent the database 310 from deleting a record of the respective connection from the database 310. The database 310 may establish a time-to-live for each connection, meaning that the connection is to be terminated after a specified period of time, unless the connection is refreshed before the specified period of time ends. The specified period of time starts at the instant that the connection is established and restarts at the beginning of each subsequent period of the periodic schedule so long as the connection is refreshed during the previous period. If the connector client 314 does not refresh the connection before the specified period of time ends for a period, the database 310 removes the record of the connection from the database 310, and the connection is no longer usable by the connector client 314 and the connector server 312. The specified period of time associated with each time-to-live may be any suitable period, such as 5 minutes, 10 minutes, or 23 minutes. The connector client 314 may be configured to refresh the connection on another periodic schedule having a period that is less than the period of time associated with each time-to-live. For instance, the connector client 314 may be configured to refresh the connection every 2 minutes, 3 minutes, 5 minutes, or 8 minutes.

In some example embodiments, one or more activities 332, 334, 336, 338, 340, 342, 344, 346, 348, 350, 352, 354, 356, 358, 360, 362, 364, 366, 368, 370, 372, 374, 376, 378, and/or 380 of activity diagram 300 may not be performed. Moreover, activities in addition to or in lieu of activities 332, 334, 336, 338, 340, 342, 344, 346, 348, 350, 352, 354, 356, 358, 360, 362, 364, 366, 368, 370, 372, 374, 376, 378, and/or 380 may be performed. It will be recognized that some activities may be combined and/or performed in parallel.

Figure 4:
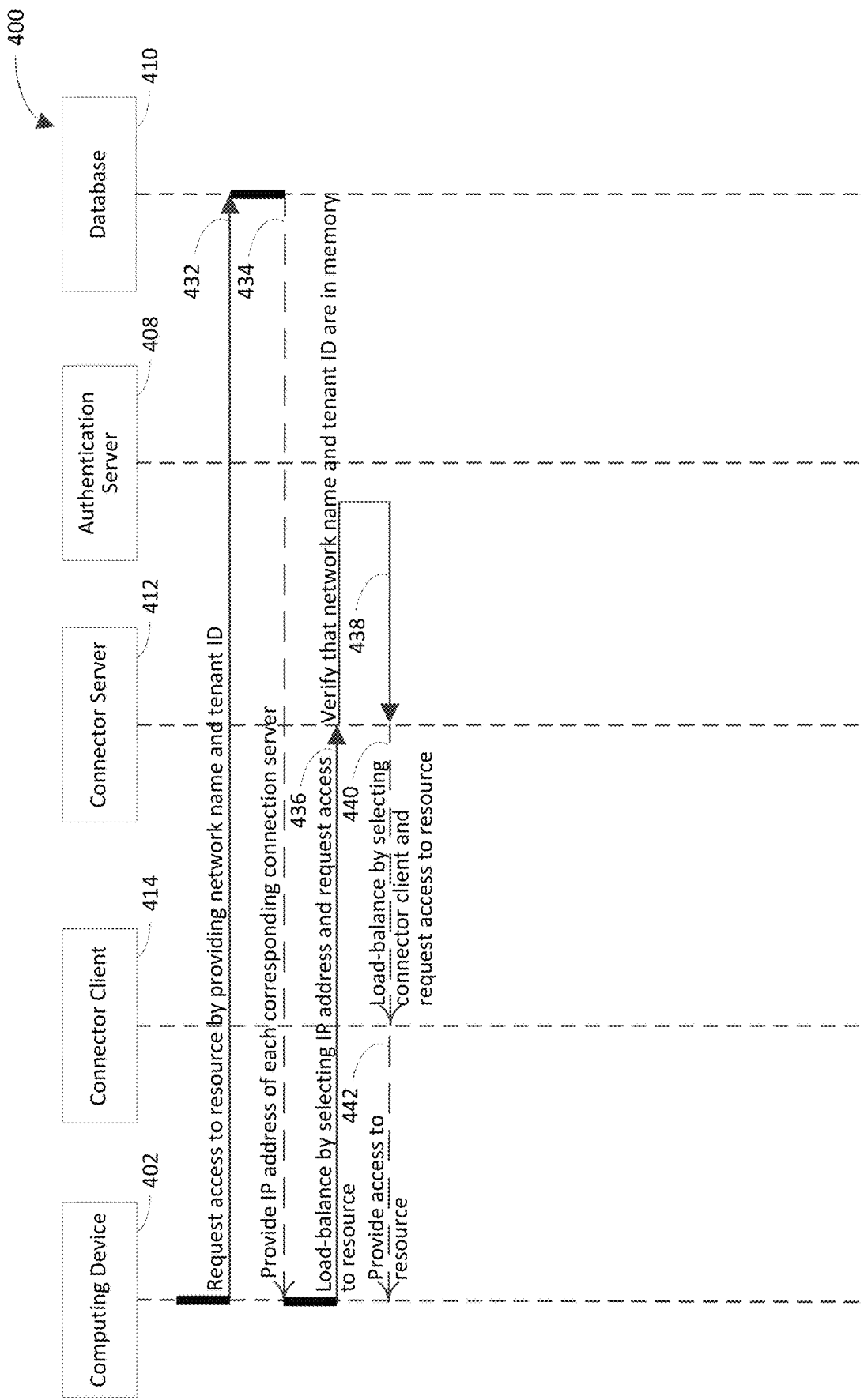
FIG. 4 is an example activity diagram for load-balancing resource requests among established connections in accordance with an embodiment.

FIG. 4 is an example activity diagram 400 for load-balancing resource requests among established connections in accordance with an embodiment. FIG. 4 depicts a computing device 402, a connector client 414, a connector server 412, an authentication server 408, and a database 410, which are example implementations of a user device 102 or 202 or a proxy server 228; a connector client 114 or 214; a connector server 112 or 212; an authentication server 108 or 208; and a database 126 or 210 shown in FIGS. 1 and 2. Activities 432, 434, 436, 438, 440, and 442 will now be described with reference to the computing device 402, the connector client 414, the connector server 412, the authentication server 408, and the database 410.

In activity 432, the computing device 402 requests access to a resource by providing the network name and the tenant identifier. For instance, the computing device 402 may provide a resource request that includes the network name and the tenant identifier. The network name is a name of the private computer network, and the tenant identifier identifies the owner of the private computer network.

In activity 434, the database 410 provides an IP address of each corresponding connector server (i.e., each connector server having an IP address that corresponds to the network name and the tenant identifier). For example, the database 410 may traverse rows of the database 410 to identify each row that includes the network name and the tenant identifier. In accordance with this example, the database 410 may identify an IP address in each row that includes the network name and the tenant identifier. It may be said that the database 410 cross-references the network name and the tenant identifier with the IP address in each row. The IP addresses in these rows correspond to (e.g., identify) respective connector servers that have connections with the private computer network. The database 410 may provide each of these IP addresses to the computing device 402. In another example, the database 410 may review cross-reference information, which cross-references the network name and the tenant identifier with the IP address of each connector server that has a connection with the private computer network. In accordance with this example, the database 410 may review the cross-reference information to identify the IP addresses of the connector servers that have a connection with the private computer network. The database 410 may provide these IP addresses to the computing device 402.

In activity 436, the computing device 402 load-balances the connections between the private computer network and the public computer network by selecting an IP address from the IP addresses that are received by the computing device 402 from the database 410. The computing device 402 may select the IP address based at least in part on a comparison of attributes of the respective connector servers that correspond to the respective IP address that are received by the computing device 402 from the database 410. In activity 436, the computing device 402 also requests access to the resource by providing a resource request that includes the network name and the tenant identifier to the connector server 412, which corresponds to the selected IP address.

In activity 438, the connector server 412 verifies that the network name and the tenant identifier in the resource request that is received from the computing device 402 match the network name and the tenant identifier that the connector server 412 stored in the memory at activity 364 in FIG. 3B.

In activity 440, the connector server 412 load-balances resource requests among the connector clients in the private computer network by selecting a connector client from those connector clients based on any of a variety of factors associated with the connector clients. It will be recognized that if the connector client 414 is the sole connector client, load-balancing the resource requests among multiple connector clients need not necessarily be performed. In activity 440, the connector server 412 also requests access to the resource by providing a resource request that includes the network name, a resource identifier that identifies the resource, and potentially the tenant identifier to the connector client 414.

In activity 442, the connector client 414 provides access to the resource to the computing device 402 based on the network name, the resource identifier, and potentially the tenant identifier that are included in the resource request received by the connector client 414 from the connector server 412.

In some example embodiments, one or more activities 432, 434, 436, 438, 440, and/or 442 of activity diagram 400 may not be performed. Moreover, activities in addition to or in lieu of activities 432, 434, 436, 438, 440, and/or 442 may be performed. It will be recognized that some activities may be combined and/or performed in parallel.

Figure 5:
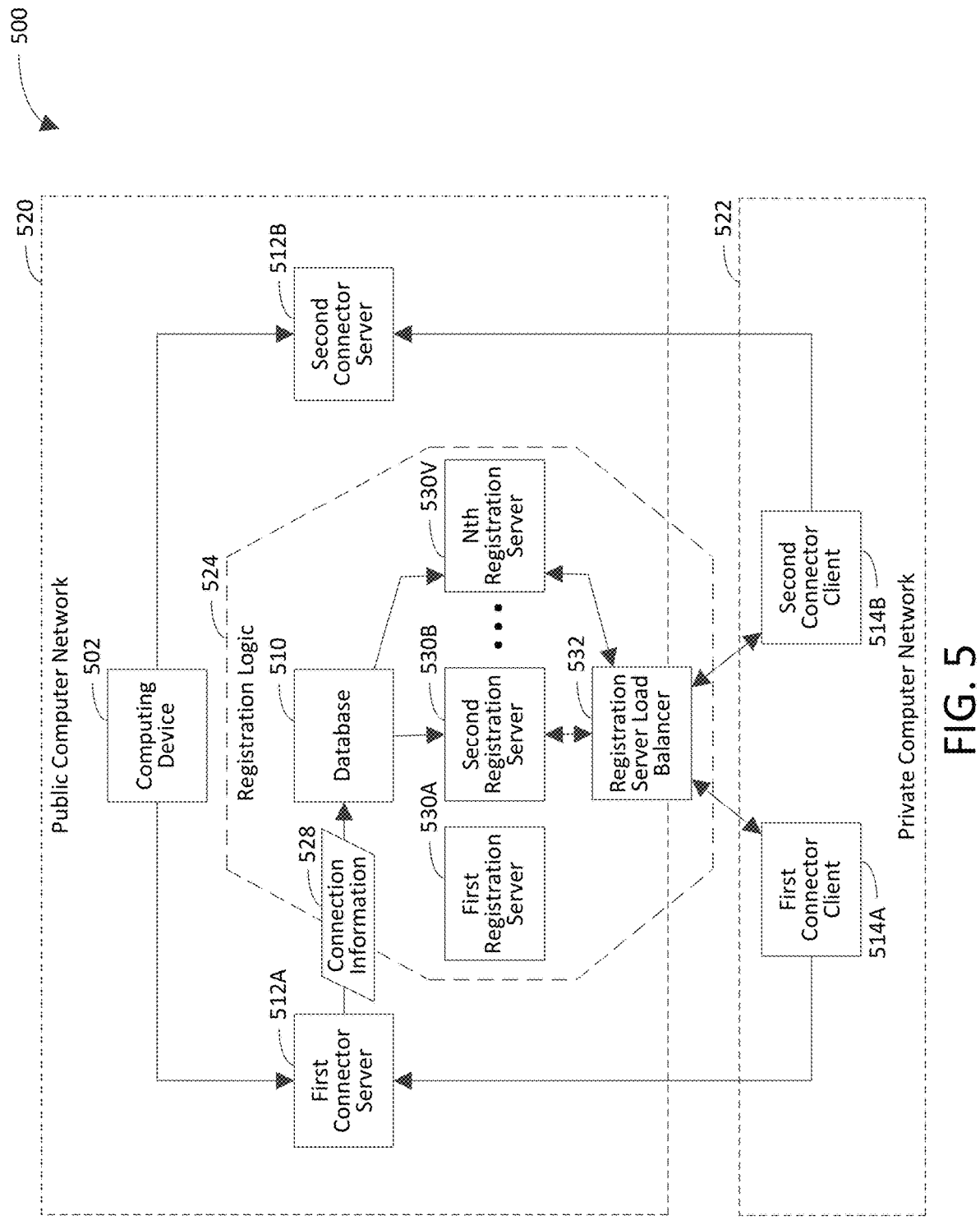

FIG. 5 is a block diagram of another example connection establishment load-balancing system 500 in accordance with an embodiment. As shown in FIG. 5, the connection establishment load-balancing system 500 includes a public computer network 520 and a private computer network 522. The private computer network 522 includes a first connector client 514A and a second connector client 514B, each of which is operable in a manner similar to any of the connector clients 114A-114R shown in FIG. 1, except that each of the connector clients 514A-514B in FIG. 5 is configured to provide connection requests that are generated by the respective connector client to the registration server load balancer 532, inquiring as to which of connector servers 512A-512B in the public computer network 520 each connection request is to be sent. The connection requests generated by the first and second connector clients 514A-514B and provided to the registration server load balancer 532 are referred to cumulatively herein as the "combined connector requests."

The first connector client 514A is assigned to the first connector server 512A. The second connector client 514B is assigned to the second connector server 512B. For example, the first and second connector clients 514A-514B may be assigned to respective first and second groups of connection servers. In accordance with this example, the first group includes only the first connector server 512A, and the second group includes only the second connector server 512B for non-limiting, illustrative purposes. It will be recognized that each group of connector servers may include any suitable number of connector servers (e.g., 1, 2, 3, 4, 5, or 6 connector servers). The number of connector servers in each group may be the same as or different from the number of connector servers in each of the other groups. The first connector client 514A being assigned to the first connector server 512A may mean that the only connection server to which the first connector client 514A is capable of providing connection requests is the first connector server 512A. The second connector client 514B being assigned to the second connector server 512B may mean that the only connection server to which the second connector client 514B is capable of providing connection requests is the second connector server 512B. Accordingly, the first connector client 514A is configured to send connection requests to the first connector server 512A and not to the second connector server 512B in response to notifications that are received by the first connector client 514A from the registration server load balancer 532. The second connector client 514B is configured to send connection requests to the second connector server 512B and not to the first connector server 512A in response to notifications received by the second connector client 514B from the registration server load balancer 532.

The first connector client 514A receives first notifications from the registration server load balancer 532, instructing the first connector client 514A to provide a first subset of the combined connection requests to the first connector server 512A. The second connector client 514B receives second notifications from the registration server load balancer 532, instructing the second connector client 514B to provide a second subset of the combined connection requests to the second connector server 512B. It will be recognized that each of the connection requests in the first subset and each of the connection requests in the second subset may have been generated by either of the first and second connector clients 514A-514B. Accordingly, the first notifications may instruct the first connector client 514A to provide one or more of the connection requests that were generated by the second connector client 514B to the first connector server 512A to facilitate establishment of one or more respective connections between the first connector client 514A and the first connector server 512A. The second notifications may instruct the second connector client 514B to provide one or more of the connection requests that were generated by the first connector client 514A to the second connector server 512B to facilitate establishment of one or more respective connections between the second connector client 514B and the second connector server 512B.

The public computer network 520 includes a computing device 502, the first and second connector servers 512A-512B, and registration logic 524. The computing device 502 is operable in a manner similar to the computing device 402 shown in FIG. 4. Each of the first and second connector servers 512A-512B is operable in a manner similar to any of the connector servers 112A-112P shown in FIG. 1. The registration logic 524 is shown to include a database 510, a plurality of registration servers 530A-530V, and a registration server load balancer 532.

The database 510 stores a state of each of the connector servers 512A-512B. The state of each connector server indicates a number of connections between the private computer network 522 (e.g., the first connector client 514A or the second connector client 514B therein) and the connector server. By storing the state of each of the connector servers 512A-512B, the database 510 enables stateful load-balancing for establishment of connections between the connector clients 514A-514B and the connector servers 512A-512B. For instance, the database 510 may be configured to synchronize the registration servers 530A-530V to share a common state, which includes knowledge of the number of connections between the private computer network 522 and each of the connection servers 512A-512B. The database 510 may determine the number of connections between the private computer network 522 and each connector server based on receipt of an indication of the number of connections from the connector server, any of the registration servers 530A-530V, or the registration server load balancer 532.

In the embodiment of FIG. 5, the database 510 is shown to receive connection information 528 from the first connector server 512A for non-limiting, illustrative purposes. The connection information 528 indicates the number of established connections between the private computer network 522 and the first connector server 512A. The database 510 may receive such connection information from each connection server, indicating the number of connections between the private computer network 522 and the respective connector server. It will be recognized that such connection information need not necessarily be received from each connection server. For instance, the database 510 may receive the connection information regarding each connection server from any one or more of the registration servers 530A-530V or the registration server load balancer 532. If the connection information regarding a connection server is received from the connection server, the connection information may confirm establishment of the connection; whereas, if the connection information regarding a connection server is received from one or more of the registration servers 530A-530V or the registration server load balancer 532, the connection information indicates that the connection is to be established, rather than the actual establishment of the connection. Accordingly, if the connection server (or a corresponding connector client) goes down after the connection information is provided by one or more of the registration servers 530A-530V or the registration server load balancer 532 but before the connection is established (e.g., by the database 510 receiving registration information regarding the connection from the connection server), the database 510 may store an inaccurate calculation of the number of connections between the private computer network 522 and the connection server. The registration information that is used to register the connection may include the name of the private computer network 522, the tenant identifier associated with the private computer network 522, and/or the IP address of the connector server.

The registration server load balancer 532 receives the combined connection requests from the first and second connector clients 514A-514B and load-balances the combined connection requests across the registration servers 530A-530V. For instance, the registration server load balancer 532 may attempt to equalize a number of connection requests that are forwarded to each of the registration servers 530A-530V. Accordingly, upon receipt of a connection request from the first connector client 514A or the second connector client 514B, the registration server load balancer 532 may provide the connection request to a registration server to which the registration server load balancer 532 has provided a number of connection requests that is less than or equal to a number of connection requests that the registration server load balancer 532 has provided to each other registration server. Upon receipt of a notification from any of the registration servers 530A-530V, indicating that a selected connector server has been selected to receive a connection request, the registration server load balancer 532 instructs the connector client that is assigned to the selected connector server to provide the connection request to the selected connector server, which causes the connector client to provide the connection request to the selected connector server. For example, the registration server load balancer 532 may provide a uniform resource identifier (URI) of the selected connector server to the connector client that is assigned to the selected connector server, which may enable the connector client to locate the selected connector server. For instance, the URI may be a uniform resource locator (URL) or a uniform resource name (URN). In accordance with this example, the registration server load balancer 532 may determine the URI as a result of the URI being included in the notification.

The registration servers 530A-530V are configured to determine which connector server (e.g., the first connector server 512A or the second connector server 512B) is to receive each connection request that is received by the registration logic 524 from the private computer network 522 (e.g., the first connector server 514A or the second connector server 514B therein). Upon receipt of a connection request from the registration server load balancer 532, a registration server queries the database 510 to determine the number of connections between the private computer network 522 and each of the connection servers 512A-512B. If the number of connections between the private computer network 522 and the first connection server 512A is fewer than the number of connections between the private computer network 522 and the second connector server 512B, the registration server selects the first connection server 512A to receive the connection request. If the number of connections between the private computer network 522 and the first connection server 512A is greater than the number of connections between the private computer network 522 and the second connector server 512B, the registration server selects the second connection server 512B to receive the connection request. If the number of connections between the private computer network 522 and the first connection server 512A and the number of connections between the private computer network 522 and the second connector server 512B are same, the registration server may select either of the first and second connection servers 512A-512B to receive the connection request. The registration server notifies the registration server load balancer 532 of the selected connector server, which the registration server has selected to receive the connection request. For example, the registration server may provide the URI of the selected connector server to the registration server load balancer 532.

The private computer network 522 is shown to include two connector clients for non-limiting illustrative purposes. It will be recognized that the private computer network 522 may include any suitable number (e.g., 2, 3, or 4) of connector clients. The public computer network 520 is shown to include two connector servers for non-limiting illustrative purposes. It will be recognized that the public computer network 520 may include any suitable number (e.g., 2, 3, or 4) of connector servers.

Figure 6:
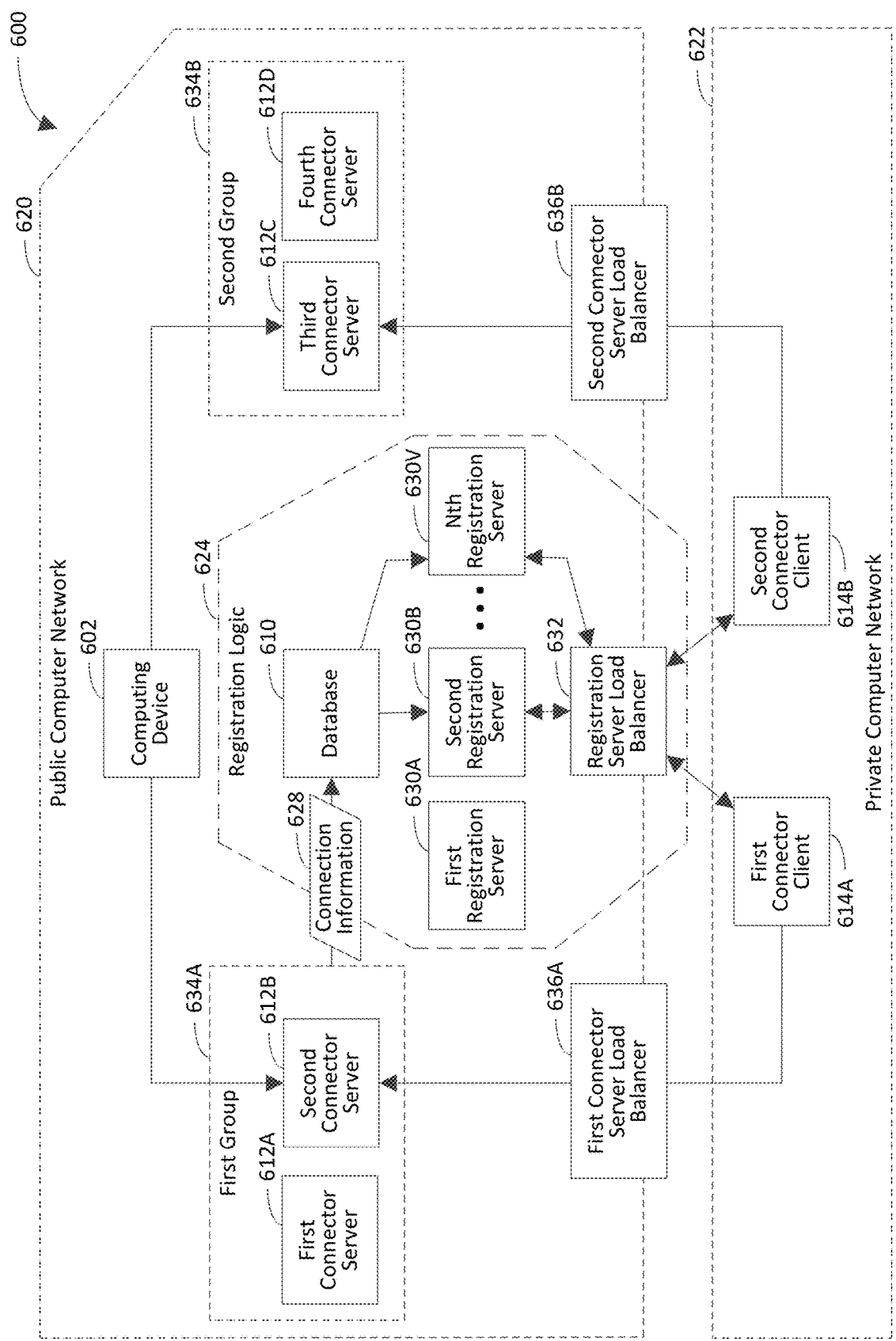

FIG. 6 is a block diagram of another example connection establishment load-balancing system 600 in accordance with an embodiment. The connection establishment load-balancing system 600 in FIG. 6 is substantially the same as the connection establishment load-balancing system 500 shown in FIG. 5, except that the connection establishment load-balancing system 600 includes first and second connector server load balancers 636A-636B and first and second groups 634A-634B of connector servers, rather than the first and second connector servers 512A-512B.

As shown in FIG. 6, the connection establishment load-balancing system 600 includes a public computer network 620 and a private computer network 622. The private computer network 622 includes first and second connector clients 614A-614B, which are operable in a manner similar to the first and second connector clients 514A-514B shown in FIG. 5. For instance, each of the connector clients 614A-614B is configured to provide connection requests that are generated by the respective connector client to the registration server load balancer 532, inquiring as to which of the groups 634A-634B in the public computer network 520 each connection request is to be sent. The connection requests generated by the first and second connector clients 614A-614B and provided to the registration server load balancer 532 are referred to cumulatively herein as the "combined connector requests."

The first connector client 614A is assigned to the first group 634A. The second connector client 614B is assigned to the second group 634B. The first connector client 614A being assigned to the first group 634A may mean that the only group of connector servers to which the first connector client 614A is capable of providing connection requests is the first group 634A. The second connector client 614B being assigned to the second group 634B may mean that the only group of connection servers to which the second connector client 614B is capable of providing connection requests is the second group 634B. Accordingly, the first connector client 614A is configured to send connection requests to the first group 634A and not to the second group 634B in response to notifications that are received by the first connector client 614A from the registration server load balancer 632. The second connector client 614B is configured to send connection requests to the second group 634B and not to the first group 634A in response to notifications received by the second connector client 614B from the registration server load balancer 632.

The first connector client 614A receives first notifications from the registration server load balancer 632, instructing the first connector client 614A to provide a first subset of the combined connection requests to the first group 634A (e.g., via a first connector server load balancer 636A coupled between the first connector client 614A and the first group 634A). The second connector client 614B receives second notifications from the registration server load balancer 632, instructing the second connector client 614B to provide a second subset of the combined connection requests to the second group 634B (e.g., via a second connector server load balancer 636B coupled between the second connector client 614B and the second group 634B). It will be recognized that each of the connection requests in the first subset and each of the connection requests in the second subset may have been generated by either of the first and second connector clients 614A-514B. Accordingly, the first notifications may instruct the first connector client 614A to provide one or more of the connection requests that were generated by the second connector client 614B to the first group 634A to facilitate establishment of one or more respective connections between the first connector client 614A and the first group 634A (e.g., any of the connector servers therein). The second notifications may instruct the second connector client 614B to provide one or more of the connection requests that were generated by the first connector client 614A to the second group 634B to facilitate establishment of one or more respective connections between the second connector client 614B and the second group 634B (e.g., any of the connector servers therein).

The public computer network 620 includes a computing device 602, the first and second groups 634A-634B of connector servers, registration logic 624, and the first and second connector server load balancers 636A-636B. The computing device 602 is operable in a manner similar to the computing device 502 shown in FIG. 5. The computing device 602 may be agnostic to the groups 634A-634B. Accordingly, resource requests that are provided by the computing device 602 may be routed to any suitable connector server, regardless to which group the connector server is assigned for purposes of establishing connections between the private computer network 622 and the public computer network 620. For instance, the groups 634A-634B may be used to facilitate establishment of connections between the private computer network 622 and the public computer network 620 and not to facilitate routing of resource requests once the connections are established. The first group 634A of connection servers includes a first connector server 612A and a second connector server 612B. The second group 634B of connection servers includes a third connector server 612C and a fourth connector server 612D. Each of the first group 634A and the second group 634B is shown to include two connector servers for non-limiting, illustrative purposes. It will be recognized that each of the first and second groups 634A-634B may include any suitable number (e.g., 2, 3, or 4) of connector servers. Each of the connector servers 612A-612D is operable in a manner similar to any of the first and second connector servers 514A-514B shown in FIG. 5.

The first connector server load balancer 636A is assigned to the first group 634A of connector servers. The first connector server load balancer 636A is configured to determine which of the first and second connector servers 612A-612B in the first group 634A is to receive each connection request that is received from the first connector client 614A, depending on how many connection requests the first connection server load balancer 636A has provided to each of the first and second connection servers 612A-612B. The first connector server load balancer 636A provides each connection request to the connector server that has received no more connection requests than any other connector server in the group 634A from the first connector server load balancer 636A. In the embodiment of FIG. 6, if the first connector server load balancer 636A has provided more connection requests to the first connector server 612A than to the second connector server 612B, the first connector server load balancer 636A provides the respective connection request to the second connector server 612B. If the first connector server load balancer 636A has provided fewer connection requests to the first connector server 612A than to the second connector server 612B, the first connector server load balancer 636A provides the respective connection request to the first connector server 612A. If the first connector server load balancer 636A has provided the same number of connection requests to the first connector server 612A and to the second connector server 612B, the first connector server load balancer 636A may provide the respective connection request to either of the first and second connector servers 612A-612B.

The second connector server load balancer 636B is assigned to the second group 634B of connector servers. The second connector server load balancer 636B is configured to determine which of the third and fourth connector servers 612C-612D in the second group 634B is to receive each connection request that is received from the second connector client 614B, depending on how many connection requests the second connection server load balancer 636B has provided to each of the third and fourth connection servers 612C-612D. The second connector server load balancer 636B provides each connection request to the connector server that has received no more connection requests than any other connector server in the group 634B from the second connector server load balancer 636B. In the embodiment of FIG. 6, if the second connector server load balancer 636B has provided more connection requests to the third connector server 612C than to the fourth connector server 612D, the second connector server load balancer 636B provides the respective connection request to the fourth connector server 612D. If the second connector server load balancer 636B has provided fewer connection requests to the third connector server 612C than to the fourth connector server 612D, the second connector server load balancer 636B provides the respective connection request to the third connector server 612C. If the second connector server load balancer 636B has provided the same number of connection requests to the third connector server 612C and to the fourth connector server 612D, the second connector server load balancer 636B may provide the respective connection request to either of the third and fourth connector servers 612C-612D.

The registration logic 624 is operable in a manner similar to the registration logic 524 shown in FIG. 5. The registration logic 624 is shown to include a database 610, a plurality of registration servers 630A-630V, and a registration server load balancer 632. The database 610 stores a state of each of the groups 634A-634B of connector servers. The state of each group indicates a number of connections between the private computer network 622 (e.g., the first connector client 614A or the second connector client 614B therein) and the group (e.g., any of the connector servers therein). By storing the state of each of the groups 634A-634B, the database 610 enables stateful load-balancing for establishment of connections between the connector clients 614A-614B and the groups 634A-634B. For instance, the database 610 may be configured to synchronize the registration servers 630A-630V to share a common state, which includes knowledge of the number of connections between the private computer network 622 and each of the groups 634A-634B. The database 610 may determine the number of connections between the private computer network 622 and each group based on receipt of notifications from the connector servers in the group. Each notification that is received from a connector server indicates establishment of one or more connections between the private computer network 622 and the connection server. For instance, each notification may indicate establishment of a respective connection. In one example implementation, the database 610 counts the number of notifications that are received from connector servers in each group to determine the number of connections between the private computer network 622 and the respective group (e.g., based on the number of connections between the private computer network 622 and the group being equal to the number of notifications that are received from connector servers in the group). In another example implementation, the database 610 tallies (e.g., sums) the numbers of connections indicated by the respective notifications that are received from connection servers in each group to determine the number of connections between the private computer network 622 and the respective group.

In the embodiment of FIG. 6, the database 610 is shown to receive connection information 628 from the first group 634A for non-limiting, illustrative purposes. The connection information 628 indicates the number of established connections between the private computer network 622 and the first group 634A (e.g., the first connector server 612A or the second connector server 612B therein). The database 610 may receive such connection information from each group, indicating the number of connections between the private computer network 622 and the respective group. It will be recognized that such connection information need not necessarily be received from each group. For instance, the database 610 may receive the connection information regarding each group from any one or more of the registration servers 630A-630V, the registration server load balancer 632, or any one or more of the connector server load balancers 636A-636B. If the connection information regarding a group is received from the group, the connection information may confirm establishment of the connections that are indicated by the connection information; whereas, if the connection information regarding a group is received from one or more of the registration servers 630A-630V, the registration server load balancer 632, or one or more of the connector server load balancers 636A-636B, the connection information indicates that the connections indicated by the connection information are to be established, rather than the actual establishment of the connections. Accordingly, if a group or a connector server therein (or a corresponding connector client) associated with a connection goes down after the connection information is provided by one or more of the registration servers 630A-630V, the registration server load balancer 632, or one or more of the connector server load balancers 636A-636B but before the connection is established (e.g., by the database 610 receiving registration information regarding the connection from the connection server), the database 610 may store an inaccurate calculation of the number of connections between the private computer network 622 and the group.

The registration server load balancer 632 receives connection requests from the first and second connector clients 614A-614B and load-balances the connection requests across the registration servers 630A-630V, as described above with respect to the registration server load balancer 532 of FIG. 5. Upon receipt of a notification from any of the registration servers 630A-630V, indicating that a selected group of connection servers has been selected to receive a connection request, the registration server load balancer 632 instructs the connector client that is assigned to the selected group to provide the connection request to the selected group, which causes the connector client to provide the connection request to the selected group (e.g., via the connector server load balancer that is assigned to the selected group). For example, the registration server load balancer 632 may provide a uniform resource identifier (URI) of the connector server load balancer that is assigned to the selected group to the connector client that is assigned to the selected group, which may enable the connector client to locate the connector server load balancer. For instance, the URI may be a uniform resource locator (URL) or a uniform resource name (URN). In accordance with this example, the registration server load balancer 632 may determine the URI as a result of the URI being included in the notification.

The registration servers 630A-630V are configured to assign the connector servers 612A-612D among the first and second groups 634A-634B. In the embodiment of FIG. 6, the registration servers 630A-630V assign the first and second connector servers 612A-612B to the first group 634A, which is associated with the first connector server load balancer 636A and the first connector client 614A. The registration servers 630A-630V assign the third and fourth connector servers 612C-612D to the second group 634B, which is associated with the second connector server load balancer 636B and the second connector client 614B. The registration servers 630A-630V may be further configured to assign the first and second connector server load balancers 636A-636B to the respective groups 634A-634B, such that the first connector server load balancer 636A is configured to provide connection requests to the first group 634A and not to the second group 634B and such that the second connector server load balancer 636B is configured to provide connection requests to the second group 634B and not to the first group 634A.

The registration servers 630A-630V are further configured to determine which group of connection servers (e.g., the first group 634A or the second group 634B) is to receive each connection request that is received by the registration logic 624 from the private computer network 622 (e.g., the first connector server 614A or the second connector server 614B therein). Upon receipt of a connection request from the registration server load balancer 632, a registration server queries the database 610 to determine the number of connections between the private computer network 622 and each of the groups 634A-634B. If the number of connections between the private computer network 622 and the first group 634A is fewer than the number of connections between the private computer network 622 and the second group 634B, the registration server selects the first group 634A to receive the connection request. If the number of connections between the private computer network 622 and the first group 634A is greater than the number of connections between the private computer network 622 and the second group 634B, the registration server selects the second group 634B to receive the connection request. If the number of connections between the private computer network 622 and the first group 634A and the number of connections between the private computer network 622 and the second group 634B are same, the registration server may select either of the first and second groups 634A-634B to receive the connection request. The registration server notifies the registration server load balancer 632 of the selected group, which the registration server has selected to receive the connection request. For example, the registration server may provide the URI of the connector server load balancer that is assigned to the selected group to the registration server load balancer 632.

The private computer network 622 is shown to include two connector clients for non-limiting illustrative purposes. It will be recognized that the private computer network 622 may include any suitable number (e.g., 2, 3, or 4) of connector clients. The public computer network 620 is shown to include two groups 634A-634B of connector servers for non-limiting illustrative purposes. It will be recognized that the public computer network 620 may include any suitable number (e.g., 2, 3, or 4) of groups of connector servers.

Figure 7:
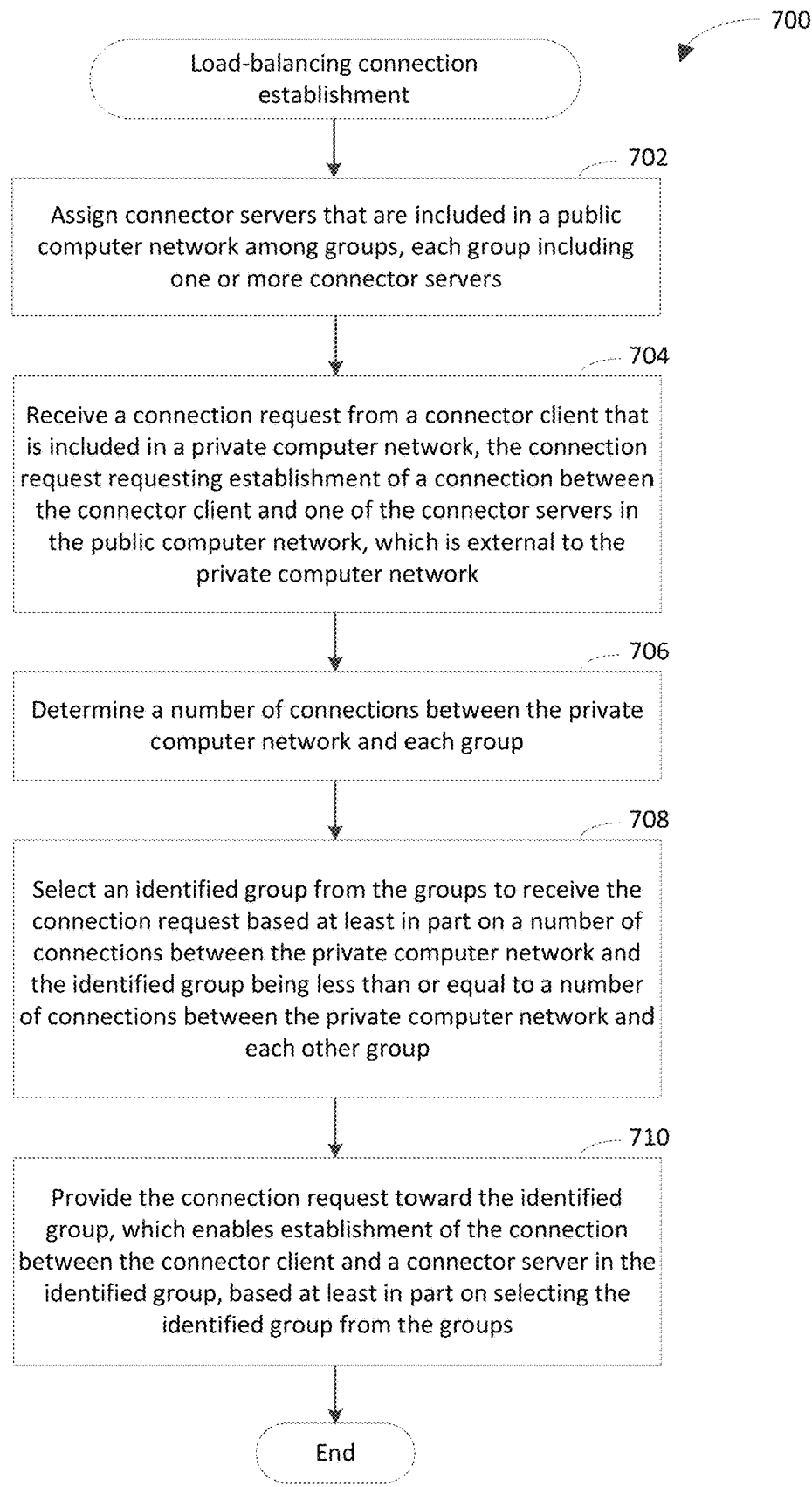
FIG. 7 depicts a flowchart of an example method for load-balancing connection establishment in accordance with an embodiment.
Figure 8:
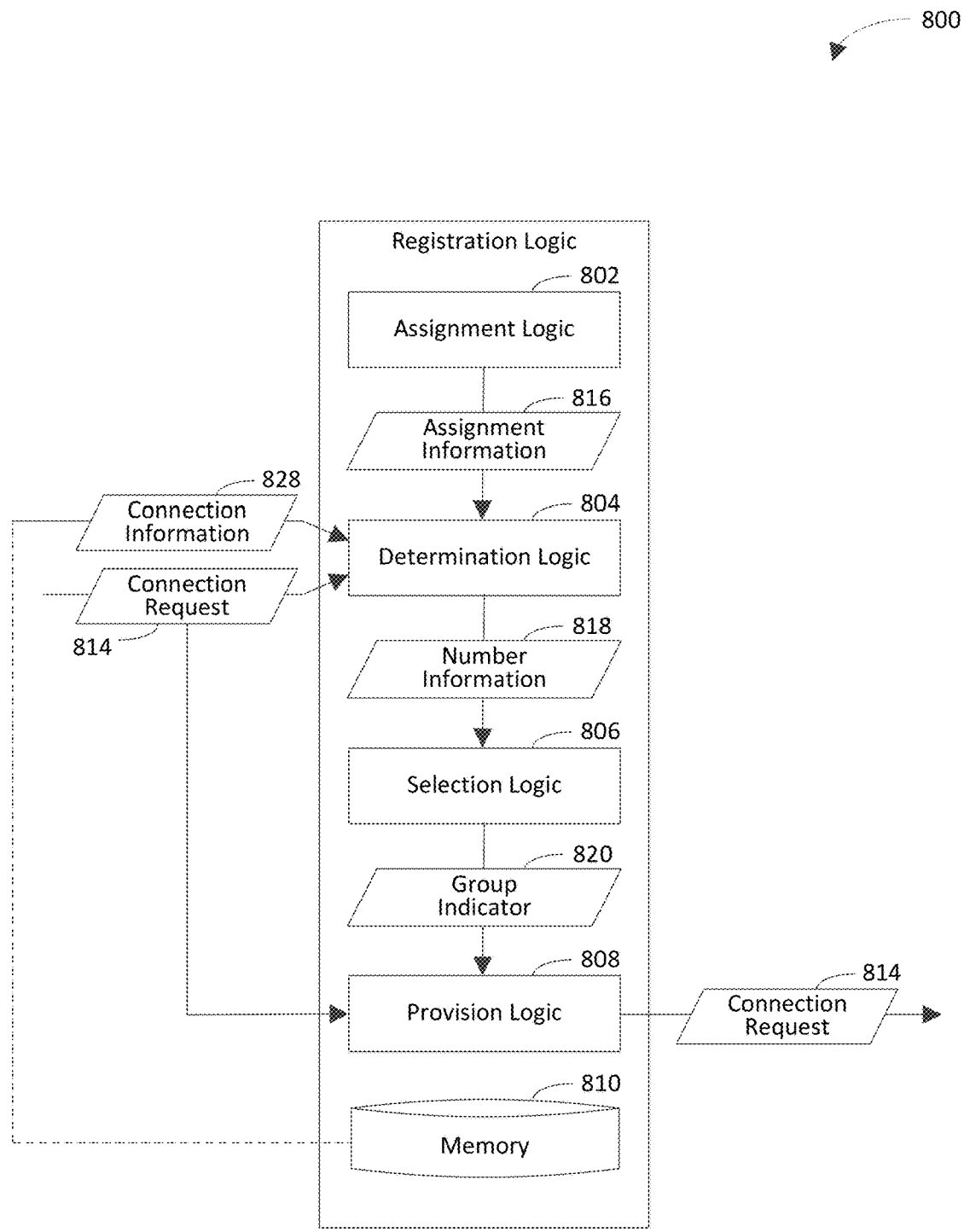
FIG. 8 is a block diagram of an example implementation of registration logic shown in FIGS. 1-3 and 5-6 in accordance with an embodiment.

FIG. 7 depicts a flowchart 700 of an example method for load-balancing connection establishment in accordance with an embodiment. Flowchart 700 may be performed by any of the registration logic 124, 224, 324, 524, and 624 shown in respective FIGS. 1-2, 3A-3B, and 5-6, for example. For illustrative purposes, flowchart 700 is described with respect to registration logic 800 shown in FIG. 8. The registration logic 800 may be an example implementation of any of the registration logic 124, 224, 324, 524, and 624. The registration logic 800 includes assignment logic 802, determination logic 804, selection logic 806, provision logic 808, and memory 810. Further structural and operational embodiments will be apparent to persons skilled in the relevant art(s) based on the discussion regarding flowchart 700.

As shown in FIG. 7, the method of flowchart 700 begins at step 702. In step 702, connector servers that are included in a public computer network are assigned among groups. Each group includes one or more connector servers. In an example implementation, the assignment logic 802 assigns the connector servers among the groups. In accordance with this implementation, the assignment logic 802 may generate assignment information, which indicates (e.g., specifies) which of the connector servers are assigned to each of the groups. For example, the assignment information 816 may indicate that a first subset of the connector servers is assigned to a first group, a second subset of the connector servers is assigned to a second group, and so on. In accordance with this example, each of the groups includes one or more of the connector servers. The groups may be mutually exclusive such that no group includes a connector server that is included in another group.

At step 704, a connection request is received from a connector client that is included in a private computer network. The connection request requests establishment of a connection between the connector client and one of the connector servers in the public computer network. The public computer network is external to the private computer network. For example, the connector request may distinguish the private computer network from other computer network(s). In accordance with this example, the connector request may include a network identifier that uniquely identifies the private computer network. The network identifier may include a name of the private computer network and/or a tenant identifier that identifies an owner of the private computer network. In an example implementation, the determination logic 804 receives a connection request 814 from the connector client. In accordance with this implementation, the connection request 814 requests establishment of the connection.

At step 706, a number of connections between the private computer network and each group is determined. In an example implementation, the determination logic 804 determines the number of connections between the private computer network and each group. For instance, the determination logic 804 may make the determination based on the assignment information 816 (e.g., based on the assignment information 816 indicating which of the connector servers are assigned to each of the groups). In accordance with this implementation, the determination logic 804 may generate number information 818, which indicates the number of connections between the private computer network and each group.

At step 708, an identified group is selected from the groups to receive the connection request based at least in part on a number of connections between the private computer network and the identified group being less than or equal to a number of connections between the private computer network and each other group. In an example implementation, selection logic 806 selects the identified group from the groups. For example, the selection logic 806 may select the identified group based on the number information 818. In accordance with this example, the selection logic 806 may review (e.g., analyze) the number information to determine the number of connections between the private computer network and each group. In further accordance with this example, the selection logic 806 may compare the number of connections between the private computer network and each of the groups to determine that the number of connections between the private computer network and the identified group is less than or equal to the number of connections between the private computer network and each other group. In further accordance with this example, the selection logic 806 may select the identified group based on the determination. In accordance with this implementation, the selection logic 806 may generate a group indicator 820, which indicates the identified group has been selected from the groups to receive the connection request 814.

At step 710, the connection request is provided toward the identified group, which enables (e.g., causes) establishment of the connection between the connector client and a connector server in the identified group (e.g., rather than a connector server in another group), based at least in part on selecting the identified group from the groups. In an example implementation, the provision logic 808 provides the connection request 814 toward the identified group. For instance, the provision logic 808 may provide the connection request 814 toward the identified group based on the group indicator 820 (e.g., based on the group indicator 820 indicating that the identified group has been selected from the groups to receive the connection request 814). For example, the provision logic 808 may provide the connection request 814 directly to the identified group. In another example, the provision logic 808 may provide the connection request 814 indirectly to the identified group (e.g., through one or more other components, such as a registration server load balancer, a connector client, and/or a connector server load balancer).

In an example embodiment, providing the connection request at step 710 causes the connector client to provide the connection request toward the identified group. For example, the connector request may be provided to the connector client, which then forwards the connection request to the identified group (e.g., either indirectly through another component, such as a connector server load balancer, or directly). In accordance with this example, the providing the connection request to the connector client may cause the connector client to provide the connection request to a connector server load balancer to enable the connector server load balancer to select one of multiple connector servers in the identified group to receive the connection request (e.g., based on a number of connections handled by the selected connection server being less than or equal to a number of connections handled by each other connection server in the identified group).

In another example embodiment, determining the number of connections between the private computer network and each group at step 706 includes providing multiple inquiries to respective connector server load balancers. Each of the connector server load balancers is configured to load-balance connections among connector servers in the group to which the respective connector server load balancer is assigned. Each inquiry requests the number of connections between the private computer network and the group to which the respective connector server load balancer is assigned. In accordance with this embodiment, determining the number of connections between the private computer network and each group at step 706 further includes receiving responses to the respective inquiries from the respective connector server load balancers. Each response indicates the number of connections between the private computer network and the group to which the respective connector server load balancer is assigned. In further accordance with this embodiment, providing the connection request at step 710 may include providing the connection request to the connector server load balancer that is assigned to the identified group, which enables the connector server load balancer to select one of multiple connector servers in the identified group to receive the connection request (e.g., based on a number of connections handled by the selected connection server being less than or equal to a number of connections handled by each other connection server in the identified group).

In some example embodiments, one or more steps 702, 704, 706, 708 and/or 710 of flowchart 700 may not be performed. Moreover, steps in addition to or in lieu of steps 702, 704, 706, 708 and/or 710 may be performed. For instance, in an example embodiment, the method of flowchart 700 further includes storing the number of connections between the private computer network and each group in a memory of a registration server that assigns the connector servers among the groups (e.g., based on the registration server being the only registration server in the registration logic). For instance, the memory 810 may store the number of connections between the private computer network and each group. In accordance with this embodiment, determining the number of connections between the private computer network and each group at step 706 includes retrieving the number of connections between the private computer network and each group from the memory of the registration server. For instance, the determination logic 804 may retrieve the number of connections between the private computer network and each group from the memory 810.

In another example embodiment, determining the number of connections between the private computer network and each group at step 706 includes providing a query to a database that is configured to synchronize multiple registration servers to share a common state. The common state includes knowledge of the number of connections between the private computer network and each group. In accordance with this embodiment, determining the number of connections between the private computer network and each group at step 706 further includes receiving a response to the query from the database. The response indicates the number of connections between the private computer network and each group.

In a first aspect of this embodiment, the common state includes the knowledge of the number of connections between the private computer network and each group based at least in part on a connection notification being provided to the database by each connector server each time a connection is established between the private computer network and the respective connector server.

In a second aspect of this embodiment, the common state includes the knowledge of the number of connections between the private computer network and each group based at least in part on a connection notification being provided to the database by each registration server each time the respective registration server provides a connection request that requests establishment of a connection toward a group.

In a third aspect of this embodiment, the common state includes the knowledge of the number of connections between the private computer network and each group based at least in part on a connection notification being provided to the database by each of multiple connector server load balancers each time the respective connector server load balancer provides a connection request that is received from a connector client and that requests establishment of a connection toward a group. Each connector server load balancer load-balances connections among connector servers in the group to which the respective connector server load balancer is assigned.

In a fourth aspect of this embodiment, the method of flowchart 700 further includes providing a confirmation notice to the database at each of multiple periodic time instances for each connection for which a connector client and a connector server remain connected via the respective connection at the respective periodic time instance. Each confirmation notice confirms that the respective connector client and the respective connector server remain connected via the respective connection at the respective periodic time instance. For instance, the provision logic 808 may provide the confirmation notice to the database at each of the periodic time instances for each connection for which a connector client and a connector server remain connected via the respective connection at the respective periodic time instance. In accordance with this aspect, the number of connections between the private computer network and each group does not take into consideration each connection between the private computer network and the respective group for which a confirmation notice is not provided within a designated duration of time that is greater than a period between adjacent periodic time instances. For example, the period may be defined by the adjacent periodic time instances.

It will be recognized that the registration logic 800 may not include one or more of the assignment logic 802, the determination logic 804, the selection logic 806, the provision logic 808, and/or the memory 810. Furthermore, the registration logic 800 may include components in addition to or in lieu of assignment logic 802, the determination logic 804, the selection logic 806, the provision logic 808, and/or the memory 810.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the connector clients 114A-114R, any one or more of the resources 116A-116T, browser 110, client-side connection load-balancing logic 118A, server-side connection load-balancing logic 118B, registration logic 124, database 126, any one or more of the connector clients 214A-214R, any one or more of the resources 216A-216T, proxy-side connection load-balancing logic 218C, server-side connection load-balancing logic 218B, registration logic 224, database 226, connector client 314, registration logic 324, database 310, connector client 414, database 410, any one or more of the connector clients 514A-514B, registration logic 524, database 510, registration server load balancer 532, any one or more of the connector clients 614A-614B, registration logic 624, database 610, registration server load balancer 632, assignment logic 802, determination logic 804, selection logic 806, provision logic 808, activity diagram 300, activity diagram 400, and/or flowchart 700 may be implemented in hardware, software, firmware, or any combination thereof.

For example, any one or more of the connector clients 114A-114R, any one or more of the resources 116A-116T, browser 110, client-side connection load-balancing logic 118A, server-side connection load-balancing logic 118B, registration logic 124, database 126, any one or more of the connector clients 214A-214R, any one or more of the resources 216A-216T, proxy-side connection load-balancing logic 218C, server-side connection load-balancing logic 218B, registration logic 224, database 226, connector client 314, registration logic 324, database 310, connector client 414, database 410, any one or more of the connector clients 514A-514B, registration logic 524, database 510, registration server load balancer 532, any one or more of the connector clients 614A-614B, registration logic 624, database 610, registration server load balancer 632, assignment logic 802, determination logic 804, selection logic 806, provision logic 808, activity diagram 300, activity diagram 400, and/or flowchart 700 may be implemented, at least in part, as computer program code configured to be executed in one or more processors.

In another example, any one or more of the connector clients 114A-114R, any one or more of the resources 116A-116T, browser 110, client-side connection load-balancing logic 118A, server-side connection load-balancing logic 118B, registration logic 124, database 126, any one or more of the connector clients 214A-214R, any one or more of the resources 216A-216T, proxy-side connection load-balancing logic 218C, server-side connection load-balancing logic 218B, registration logic 224, database 226, connector client 314, registration logic 324, database 310, connector client 414, database 410, any one or more of the connector clients 514A-514B, registration logic 524, database 510, registration server load balancer 532, any one or more of the connector clients 614A-614B, registration logic 624, database 610, registration server load balancer 632, assignment logic 802, determination logic 804, selection logic 806, provision logic 808, activity diagram 300, activity diagram 400, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system comprises memory and one or more processors coupled to the memory. The one or more processors are configured to load-balance establishment of a plurality of connections among a plurality of groups by performing operations. Each group includes one or more connector servers of a plurality of connector servers that are included in a public computer network. The operations comprise receiving a connection request from a connector client that is included in a private computer network. The connection request requests establishment of a connection between the connector client and one of the plurality of connector servers in the public computer network, which is external to the private computer network. The operations further comprise determining a number of connections between the private computer network and each group. The operations further comprise selecting an identified group from the plurality of groups to receive the connection request based at least in part on a number of connections between the private computer network and the identified group being less than or equal to a number of connections between the private computer network and each other group. The operations further comprise providing the connection request toward the identified group, which enables establishment of the connection between the connector client and a connector server in the identified group, based at least in part on the identified group being selected from the plurality of groups.

In a first aspect of the example system, the one or more processors are configured to perform the operations comprising providing the connection request to the connector client, which causes the connector client to provide the connection request toward the identified group.

In a second aspect of the example system, the one or more processors are configured to determine the number of connections between the private computer network and each group by performing the following: providing a plurality of inquiries to a plurality of respective connector server load balancers, each of which is configured to load-balance connections among connector servers in the group to which the respective connector server load balancer is assigned, each inquiry requesting the number of connections between the private computer network and the group to which the respective connector server load balancer is assigned; and receiving a plurality of responses to the plurality of respective inquiries from the plurality of respective connector server load balancers, each response indicating the number of connections between the private computer network and the group to which the respective connector server load balancer is assigned. The second aspect of the example system may be implemented in combination with the first aspect of the example system, though the example embodiments are not limited in this respect.

In an implementation of the second aspect of the example system, the one or more processors are configured to perform the operations comprising providing the connection request to the connector server load balancer that is assigned to the identified group, which enables the connector server load balancer to select one of a plurality of connector servers in the identified group to receive the connection request.

In a third aspect of the example system, the one or more processors are configured to perform the operations comprising: storing the number of connections between the private computer network and each group in a memory of a registration server that selects the identified group from the plurality of groups; and determining the number of connections between the private computer network and each group by retrieving the number of connections between the private computer network and each group from the memory of the registration server. The third aspect of the example system may be implemented in combination with the first and/or second aspect of the example system, though the example embodiments are not limited in this respect.

In a fourth aspect of the example system, the one or more processors are configured to determine the number of connections between the private computer network and each group comprises by performing the following: providing a query to a database that is configured to synchronize a plurality of registration servers to share a common state, the common state including knowledge of the number of connections between the private computer network and each group; and receiving a response to the query from the database, the response indicating the number of connections between the private computer network and each group. The fourth aspect of the example system may be implemented in combination with the first, second, and/or third aspect of the example system, though the example embodiments are not limited in this respect.

In a first implementation of the fourth aspect of the example system, the knowledge of the number of connections between the private computer network and each group is based at least in part on transmission of a connection notification to the database by each connector server each time a connection is established between the private computer network and the respective connector server.

In a second implementation of the fourth aspect of the example system, the knowledge of the number of connections between the private computer network and each group is based at least in part on transmission of a connection notification to the database by each registration server each time the respective registration server provides a connection request that requests establishment of a connection toward a group of the plurality of groups.

In a third implementation of the fourth aspect of the example system, the knowledge of the number of connections between the private computer network and each group is based at least in part on transmission of a connection notification to the database by each of a plurality of connector server load balancers each time the respective connector server load balancer provides a connection request that is received from a connector client and that requests establishment of a connection toward a group of the plurality of groups, wherein each connector server load balancer load-balances connections among connector servers in the group to which the respective connector server load balancer is assigned.

In a fourth implementation of the fourth aspect of the example system, the one or more processors are configured to perform the operations further comprising providing a confirmation notice to the database at each of a plurality of periodic time instances for each connection for which a connector client and a connector server remain connected via the respective connection at the respective periodic time instance. Each confirmation notice confirms that the respective connector client and the respective connector server remain connected via the respective connection at the respective periodic time instance. In accordance with the fourth implementation, the number of connections between the private computer network and each group does not take into consideration each connection between the private computer network and the respective group for which a confirmation notice is not provided within a designated duration of time that is greater than a period between adjacent periodic time instances of the plurality of period time instances.

In a fifth aspect of the example system, the connection request includes a network identifier that uniquely identifies the private computer network. The fifth aspect of the example system may be implemented in combination with the first, second, third, and/or fourth aspect of the example system, though the example embodiments are not limited in this respect.

In an implementation of the fifth aspect of the example system, the network identifier includes a name of the private computer network and a tenant identifier that identifies an owner of the private computer network.

In an example method of load-balancing connection establishment, a plurality of connector servers that are included in a public computer network are assigned among a plurality of groups. Each group includes one or more connector servers of the plurality of connector servers. A connection request is received from a connector client that is included in a private computer network. The connection request requests establishment of a connection between the connector client and one of the plurality of connector servers in the public computer network, which is external to the private computer network. A number of connections between the private computer network and each group is determined. An identified group is selected from the plurality of groups to receive the connection request based at least in part on a number of connections between the private computer network and the identified group being less than or equal to a number of connections between the private computer network and each other group. The connection request is provided toward the identified group, which enables establishment of the connection between the connector client and a connector server in the identified group, based at least in part on selecting the identified group from the plurality of groups.

In a first aspect of the example method, providing the connection request comprises providing the connection request to the connector client, which causes the connector client to provide the connection request toward the identified group.

In a second aspect of the example method, determining the number of connections between the private computer network and each group comprises providing a plurality of inquiries to a plurality of respective connector server load balancers, each of which is configured to load-balance connections among connector servers in the group to which the respective connector server load balancer is assigned. Each inquiry requests the number of connections between the private computer network and the group to which the respective connector server load balancer is assigned. In accordance with the second aspect, determining the number of connections between the private computer network and each group further comprises receiving a plurality of responses to the plurality of respective inquiries from the plurality of respective connector server load balancers. Each response indicates the number of connections between the private computer network and the group to which the respective connector server load balancer is assigned. The second aspect of the example method may be implemented in combination with the first aspect of the example method, though the example embodiments are not limited in this respect.

In an implementation of the second aspect of the example method, providing the connection request comprises providing the connection request to the connector server load balancer that is assigned to the identified group, which enables the connector server load balancer to select one of a plurality of connector servers in the identified group to receive the connection request.

In a third aspect of the example method, the example method further comprises storing the number of connections between the private computer network and each group in a memory of a registration server that assigns the plurality of connector servers among the plurality of groups. In accordance with the third aspect, determining the number of connections between the private computer network and each group comprises retrieving the number of connections between the private computer network and each group from the memory of the registration server. The third aspect of the example method may be implemented in combination with the first and/or second aspect of the example method, though the example embodiments are not limited in this respect.

In a fourth aspect of the example method, determining the number of connections between the private computer network and each group comprises providing a query to a database that is configured to synchronize a plurality of registration servers to share a common state, the common state including knowledge of the number of connections between the private computer network and each group. In accordance with the fourth aspect, determining the number of connections between the private computer network and each group further comprises receiving a response to the query from the database, the response indicating the number of connections between the private computer network and each group. The fourth aspect of the example method may be implemented in combination with the first, second, and/or third aspect of the example method, though the example embodiments are not limited in this respect.

In a first implementation of the fourth aspect of the example method, the common state includes the knowledge of the number of connections between the private computer network and each group based at least in part on a connection notification being provided to the database by each connector server each time a connection is established between the private computer network and the respective connector server.

In a second implementation of the fourth aspect of the example method, the common state includes the knowledge of the number of connections between the private computer network and each group based at least in part on a connection notification being provided to the database by each registration server each time the respective registration server provides a connection request that requests establishment of a connection toward a group of the plurality of groups.

In a third implementation of the fourth aspect of the example method, the common state includes the knowledge of the number of connections between the private computer network and each group based at least in part on a connection notification being provided to the database by each of a plurality of connector server load balancers each time the respective connector server load balancer provides a connection request that is received from a connector client and that requests establishment of a connection toward a group of the plurality of groups, wherein each connector server load balancer load-balances connections among connector servers in the group to which the respective connector server load balancer is assigned.

In a fourth implementation of the fourth aspect of the example method, the example method further comprises providing a confirmation notice to the database at each of a plurality of periodic time instances for each connection for which a connector client and a connector server remain connected via the respective connection at the respective periodic time instance. Each confirmation notice confirms that the respective connector client and the respective connector server remain connected via the respective connection at the respective periodic time instance. In accordance with the fourth aspect, the number of connections between the private computer network and each group does not take into consideration each connection between the private computer network and the respective group for which a confirmation notice is not provided within a designated duration of time that is greater than a period between adjacent periodic time instances of the plurality of period time instances.

In a fifth aspect of the example method, the connection request includes a network identifier that uniquely identifies the private computer network. The fifth aspect of the example method may be implemented in combination with the first, second, third, and/or fourth aspect of the example method, though the example embodiments are not limited in this respect.

In an implementation of the fifth aspect of the example method, the network identifier includes a name of the private computer network and a tenant identifier that identifies an owner of the private computer network.

An example computer program product comprises a computer-readable storage medium having instructions recorded thereon for enabling a processor-based system to perform operations. The operations comprise load-balance establishment of a plurality of connections among a plurality of groups, each group including one or more connector servers of a plurality of connector servers that are included in a public computer network, by performing the following: receive a connection request from a connector client that is included in a private computer network, the connection request requesting establishment of a connection between the connector client and one of the plurality of connector servers in the public computer network, which is external to the private computer network; determine a number of connections between the private computer network and each group; select an identified group from the plurality of groups to receive the connection request based at least in part on a number of connections between the private computer network and the identified group being less than or equal to a number of connections between the private computer network and each other group; and provide the connection request toward the identified group, which enables establishment of the connection between the connector client and a connector server in the identified group, based at least in part on the identified group being selected from the plurality of groups.

IV. Example Computer System

Figure 9:
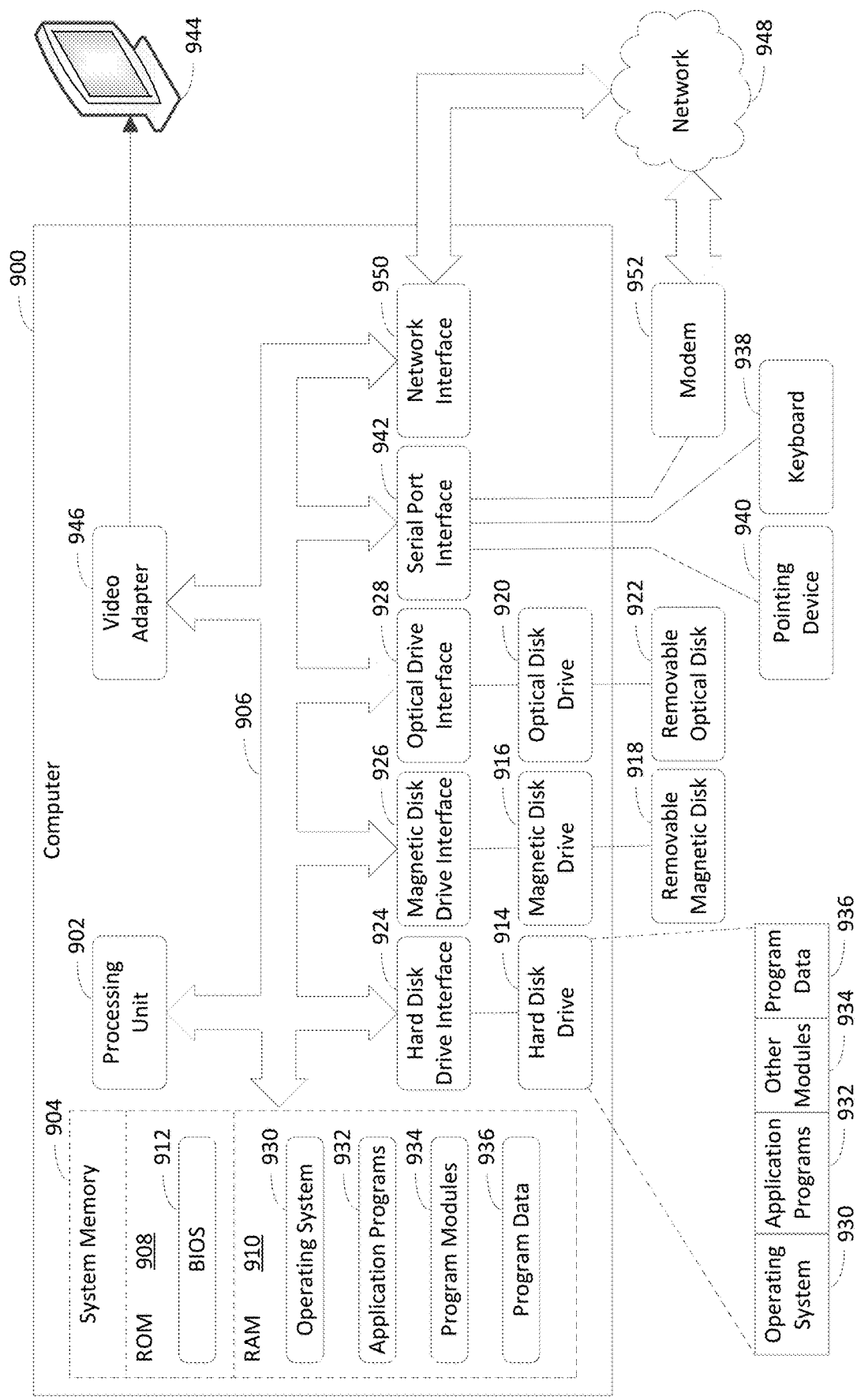
FIG. 9 depicts an example computer in which embodiments may be implemented.

FIG. 9 depicts an example computer 900 in which embodiments may be implemented. Any one or more of user devices 102A-102M, any one or more of web servers 106A-106N, authentication server 108, any one or more of connector servers 112A-112P, any one or more connector clients 114A-114R, any one or more of resources 116A-116T, and/or registration logic 124 shown in FIG. 1; any one or more of user devices 202A-202M, any one or more of web servers 206A-206N, authentication server 208, any one or more of connector servers 212A-212P, any one or more connector clients 214A-214R, any one or more of resources 216A-216T, registration logic 224, and/or proxy server 228 shown in FIG. 2; connector client 314, registration logic 324, connector server 312, authentication server 308, and/or database 310 shown in FIG. 3; computing device 402, connector client 414, connector server 412, authentication server 408, and/or database 410 shown in FIG. 4; computing device 502, any one or more of connector servers 512A-512B, any one or more of connector clients 514A-514B, database 510, any one or more of registration servers 530A-530V, and/or registration server load balancer 532 shown in FIG. 5; computing device 602, any one or more of connector servers 612A-612D, any one or more of connector clients 614A-614B, database 610, any one or more of registration servers 630A-630V, and/or registration server load balancer 632 shown in FIG. 6; and/or registration logic 800 shown in FIG. 8 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the following: any one or more of the connector clients 114A-114R, any one or more of the resources 116A-116T, browser 110, client-side connection load-balancing logic 118A, server-side connection load-balancing logic 118B, registration logic 124, database 126, any one or more of the connector clients 214A-214R, any one or more of the resources 216A-216T, proxy-side connection load-balancing logic 218C, server-side connection load-balancing logic 218B, registration logic 224, database 226, connector client 314, registration logic 324, database 310, connector client 414, database 410, any one or more of the connector clients 514A-514B, registration logic 524, database 510, registration server load balancer 532, any one or more of the connector clients 614A-614B, registration logic 624, database 610, registration server load balancer 632, assignment logic 802, determination logic 804, selection logic 806, provision logic 808, activity diagram 300 (including any activity of activity diagram 300), activity diagram 400 (including any activity of activity diagram 400), and/or flowchart 700 (including any step of flowchart 700), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A system comprising:
memory; and
one or more processors coupled to the memory, the one or more processors configured to load-balance establishment of a plurality of connections among a plurality of groups, each group including one or more connector servers of a plurality of connector servers that are included in a public computer network, by performing operations, the operations comprising:
receive a connection request from a connector client that is included in a private computer network, the connection request requesting establishment of a connection between the connector client and one of the plurality of connector servers in the public computer network, which is external to the private computer network;
determine a number of connections from the plurality of connections that are between the private computer network and each group, the plurality of connections including a single connection to each of multiple connector clients that are included in the private computer network;
select an identified group from the plurality of groups to receive the connection request based at least in part on a number of connections from the plurality of connections that are between the private computer network and the identified group being less than or equal to a number of connections from the plurality of connections that are between the private computer network and each other group; and
provide the connection request toward the identified group based at least in part on the identified group being selected from the plurality of groups, the connection request configured to enable establishment of the connection between the connector client and a connector server in the identified group.

2. The system of claim 1, wherein the one or more processors are configured to perform the operations comprising:
cause the connector client to provide the connection request toward the identified group by providing the connection request to the connector client.

3. The system of claim 1, wherein the one or more processors are configured to determine the number of connections between the private computer network and each group by performing the following:
provide a plurality of inquiries to a plurality of respective connector server load balancers, each of which is configured to load-balance connections among connector servers in the group to which the respective connector server load balancer is assigned, each inquiry requesting the number of connections between the private computer network and the group to which the respective connector server load balancer is assigned; and
receive a plurality of responses to the plurality of respective inquiries from the plurality of respective connector server load balancers, each response indicating the number of connections between the private computer network and the group to which the respective connector server load balancer is assigned.

4. The system of claim 3, wherein the one or more processors are configured to perform the operations comprising:
enable the connector server load balancer that is assigned to the identified group to select one of a plurality of connector servers in the identified group to receive the connection request by providing the connection request to the connector server load balancer.

5. The system of claim 1, wherein the one or more processors are configured to perform the operations comprising:
store the number of connections between the private computer network and each group in a memory of a registration server that selects the identified group from the plurality of groups; and
determine the number of connections between the private computer network and each group by retrieving the number of connections between the private computer network and each group from the memory of the registration server.

6. The system of claim 1, wherein the one or more processors are configured to determine the number of connections between the private computer network and each group comprises by performing the following:

provide a query to a database that is configured to synchronize a plurality of registration servers to share a common state, the common state including knowledge of the number of connections between the private computer network and each group; and receive a response to the query from the database, the response indicating the number of connections between the private computer network and each group.

7. The system of claim 6, wherein the one or more processors are configured to perform the operations further comprising:

provide a confirmation notice to the database at each of a plurality of periodic time instances for each connection for which a connector client and a connector server remain connected via the respective connection at the respective periodic time instance, each confirmation notice confirming that the respective connector client and the respective connector server remain connected via the respective connection at the respective periodic time instance; and wherein the number of connections between the private computer network and each group does not take into consideration each connection between the private computer network and the respective group for which a confirmation notice is not provided within a designated duration of time that is greater than a period between adjacent periodic time instances of the plurality of period time instances.

8. The system of claim 1, wherein the connection request includes a network identifier that uniquely identifies the private computer network.

9. The system of claim 8, wherein the network identifier includes a name of the private computer network and a tenant identifier that identifies an owner of the private computer network.

10. A method of load-balancing connection establishment, the method comprising:

assigning a plurality of connector servers that are included in a public computer network among a plurality of groups, each group including one or more connector servers of the plurality of connector servers;

receiving a connection request from a connector client that is included in a private computer network, the connection request requesting establishment of a connection between the connector client and one of the plurality of connector servers in the public computer network, which is external to the private computer network;

determining a number of connections from the plurality of connections that are between the private computer network and each group, the plurality of connections including a single connection to each of multiple connector clients that are included in the private computer network;

selecting an identified group from the plurality of groups to receive the connection request based at least in part on a number of connections from the plurality of connections that are between the private computer network and the identified group being less than or equal to a number of connections from the plurality of connections that are between the private computer network and each other group; and providing the connection request toward the identified group based at least in part on selecting the identified group from the plurality of groups, the connection request configured to enable establishment of the connection between the connector client and a connector server in the identified group.

11. The method of claim 10, wherein providing the connection request comprises:

causing the connector client to provide the connection request toward the identified group by providing the connection request to the connector client.

12. The method of claim 10, wherein determining the number of connections between the private computer network and each group comprises:

providing a plurality of inquiries to a plurality of respective connector server load balancers, each of which is configured to load-balance connections among connector servers in the group to which the respective connector server load balancer is assigned, each inquiry requesting the number of connections between the private computer network and the group to which the respective connector server load balancer is assigned; and receiving a plurality of responses to the plurality of respective inquiries from the plurality of respective connector server load balancers, each response indicating the number of connections between the private computer network and the group to which the respective connector server load balancer is assigned.

13. The method of claim 12, wherein providing the connection request comprises:

enabling the connector server load balancer that is assigned to the identified group to select one of a plurality of connector servers in the identified group to receive the connection request by providing the connection request to the connector server load balancer.

14. The method of claim 10, further comprising:

storing the number of connections between the private computer network and each group in a memory of a registration server that assigns the plurality of connector servers among the plurality of groups;

wherein determining the number of connections between the private computer network and each group comprises:

retrieving the number of connections between the private computer network and each group from the memory of the registration server.

15. The method of claim 10, wherein determining the number of connections between the private computer network and each group comprises:

providing a query to a database that is configured to synchronize a plurality of registration servers to share a common state, the common state including knowledge of the number of connections between the private computer network and each group; and receiving a response to the query from the database, the response indicating the number of connections between the private computer network and each group.

16. The method of claim 15, wherein the common state includes the knowledge of the number of connections between the private computer network and each group based at least in part on a connection notification being provided to the database by each connector server each time a connection is established between the private computer network and the respective connector server.

17. The method of claim 15, wherein the common state includes the knowledge of the number of connections between the private computer network and each group based at least in part on a connection notification being provided to the database by each registration server each time the respective registration server provides a connection request that requests establishment of a connection toward a group of the plurality of groups.

18. The method of claim 15, wherein the common state includes the knowledge of the number of connections between the private computer network and each group based at least in part on a connection notification being provided to the database by each of a plurality of connector server load balancers each time the respective connector server load balancer provides a connection request that is received from a connector client and that requests establishment of a connection toward a group of the plurality of groups, wherein each connector server load balancer load-balances connections among connector servers in the group to which the respective connector server load balancer is assigned.

19. The method of claim 15, further comprising:
providing a confirmation notice to the database at each of a plurality of periodic time instances for each connection for which a connector client and a connector server remain connected via the respective connection at the respective periodic time instance, each confirmation notice confirming that the respective connector client and the respective connector server remain connected via the respective connection at the respective periodic time instance;
wherein the number of connections between the private computer network and each group does not take into consideration each connection between the private computer network and the respective group for which a confirmation notice is not provided within a designated duration of time that is greater than a period between adjacent periodic time instances of the plurality of period time instances.

20. A computer program product comprising a computer-readable storage medium having instructions recorded thereon for enabling a processor-based system to perform operations, the operations comprising:
load-balance establishment of a plurality of connections among a plurality of groups, each group including one or more connector servers of a plurality of connector servers that are included in a public computer network, by performing the following:
receive a connection request from a connector client that is included in a private computer network, the connection request requesting establishment of a connection between the connector client and one of the plurality of connector servers in the public computer network, which is external to the private computer network;
determine a number of connections between the private computer network and each group, wherein each connection between the private computer network and a respective group enables a connector server in the respective group to provide a request to access a resource in the private computer network to a respective connector client in the private computer network;
select an identified group from the plurality of groups to receive the connection request based at least in part on a number of connections between the private computer network and the identified group being less than or equal to a number of connections between the private computer network and each other group; and
provide the connection request toward the identified group based at least in part on the identified group being selected from the plurality of groups, the connection request configured to enable establishment of the connection between the connector client and a connector server in the identified group.

* * * * *